United States Patent
Nakamura et al.

(10) Patent No.: US 9,097,898 B2
(45) Date of Patent: Aug. 4, 2015

(54) OPTICAL SCANNING APPARATUS AND IMAGE FORMING APPARATUS INCLUDING A MULTI-FACETED MIRROR TO DEFLECT A LIGHT BEAM

(75) Inventors: Tadashi Nakamura, Tokyo (JP); Shingo Tachikawa, Tokyo (JP); Naoto Watanabe, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 74 days.

(21) Appl. No.: 13/545,375

(22) Filed: Jul. 10, 2012

(65) Prior Publication Data
US 2013/0016171 A1  Jan. 17, 2013

(30) Foreign Application Priority Data

Jul. 11, 2011  (JP) .................................. 2011-152442

(51) Int. Cl.
| | |
|---|---|
| B41J 15/14 | (2006.01) |
| B41J 27/00 | (2006.01) |
| G02B 26/12 | (2006.01) |
| B41J 2/47 | (2006.01) |

(52) U.S. Cl.
CPC ............... *G02B 26/123* (2013.01); *B41J 2/473* (2013.01)

(58) Field of Classification Search
USPC ......... 347/231–233, 236, 238, 241–244, 246, 347/256–261
See application file for complete search history.

(56) References Cited

U.S. PATENT DOCUMENTS

| | | | |
|---|---|---|---|
| 6,317,244 B1 * | 11/2001 | Ishibe ........................ | 359/204.1 |
| 7,471,434 B2 | 12/2008 | Nakamura et al. | |
| 7,545,547 B2 | 6/2009 | Hayashi et al. | |
| 7,643,193 B2 | 1/2010 | Nakamura et al. | |
| 7,687,762 B2 | 3/2010 | Watanabe et al. | |
| 7,729,031 B2 | 6/2010 | Nakamura et al. | |
| 7,764,301 B2 | 7/2010 | Suzuki et al. | |
| 7,855,818 B2 | 12/2010 | Nakamura | |
| 7,869,110 B2 | 1/2011 | Nakamura et al. | |
| 7,924,487 B2 | 4/2011 | Miyatake et al. | |
| 7,961,211 B2 | 6/2011 | Nakamura | |
| 7,969,634 B2 | 6/2011 | Watanabe et al. | |

(Continued)

FOREIGN PATENT DOCUMENTS

| | | | | | |
|---|---|---|---|---|---|
| JP | 59-193413 A | | 11/1984 | | |
| JP | 03059614 A | * | 3/1991 | ............. | G02B 26/10 |

(Continued)

OTHER PUBLICATIONS

Office Action issued Mar. 6, 2015 in Japanese Patent Application No. 2011-152442.

*Primary Examiner* — Hai C Pham
(74) *Attorney, Agent, or Firm* — Oblon, McClelland, Maier & Neustadt, L.L.P.

(57) ABSTRACT

An optical scanning apparatus scans a target surface with a light beam along a main scanning direction. The apparatus includes a light source, an optical deflector which includes a rotating multi-faceted mirror, each surface of the multi-faceted mirror acting as a reflecting surface to deflect the light beam from the light source, and a scanning optical system configured to guide the light beam deflected by the optical deflector to the target surface. An angle which is formed between the light beam toward the reflecting surface of the optical deflector and the corresponding reflecting surface and which includes a reflected light reflected from the corresponding reflecting surface is always obtuse.

11 Claims, 35 Drawing Sheets

(56) References Cited

U.S. PATENT DOCUMENTS

| | | |
|---|---|---|
| 8,022,347 B2 | 9/2011 | Tatsuno et al. |
| 8,023,166 B2 | 9/2011 | Nakamura et al. |
| 8,045,248 B2 | 10/2011 | Watanabe et al. |
| 8,169,457 B2 | 5/2012 | Kubo et al. |
| 8,199,179 B2 | 6/2012 | Hayashi et al. |
| 8,456,726 B2 * | 6/2013 | Watanabe et al. .......... 359/204.4 |
| 2002/0005887 A1 * | 1/2002 | Nakase et al. ................ 347/134 |
| 2004/0183890 A1 * | 9/2004 | Sakamoto et al. ............ 347/233 |
| 2008/0055672 A1 | 3/2008 | Watanabe et al. |
| 2008/0285104 A1 | 11/2008 | Arai et al. |
| 2009/0073523 A1 | 3/2009 | Nakamura |
| 2009/0324293 A1 * | 12/2009 | Tomioka ....................... 399/221 |
| 2010/0091083 A1 | 4/2010 | Itami et al. |
| 2010/0091342 A1 | 4/2010 | Nakamura |
| 2011/0058230 A1 | 3/2011 | Soeda et al. |
| 2011/0110687 A1 | 5/2011 | Miyatake et al. |
| 2011/0216386 A1 | 9/2011 | Watanabe et al. |
| 2011/0318057 A1 | 12/2011 | Watanabe |

FOREIGN PATENT DOCUMENTS

| | | | | |
|---|---|---|---|---|
| JP | 5-273481 A | | 10/1993 | |
| JP | 11-183837 A | | 7/1999 | |
| JP | 2004184656 A | * | 7/2004 | ................ B41J 2/44 |
| JP | 2006-198881 A | | 8/2006 | |
| JP | 2008-46498 A | | 2/2008 | |
| JP | 2008-257169 | | 10/2008 | |
| JP | 2009-98332 A | | 5/2009 | |
| JP | 4428920 | | 12/2009 | |
| JP | 4568633 | | 8/2010 | |
| JP | 4634881 | | 11/2010 | |

* cited by examiner (t=ts)

(t=te)

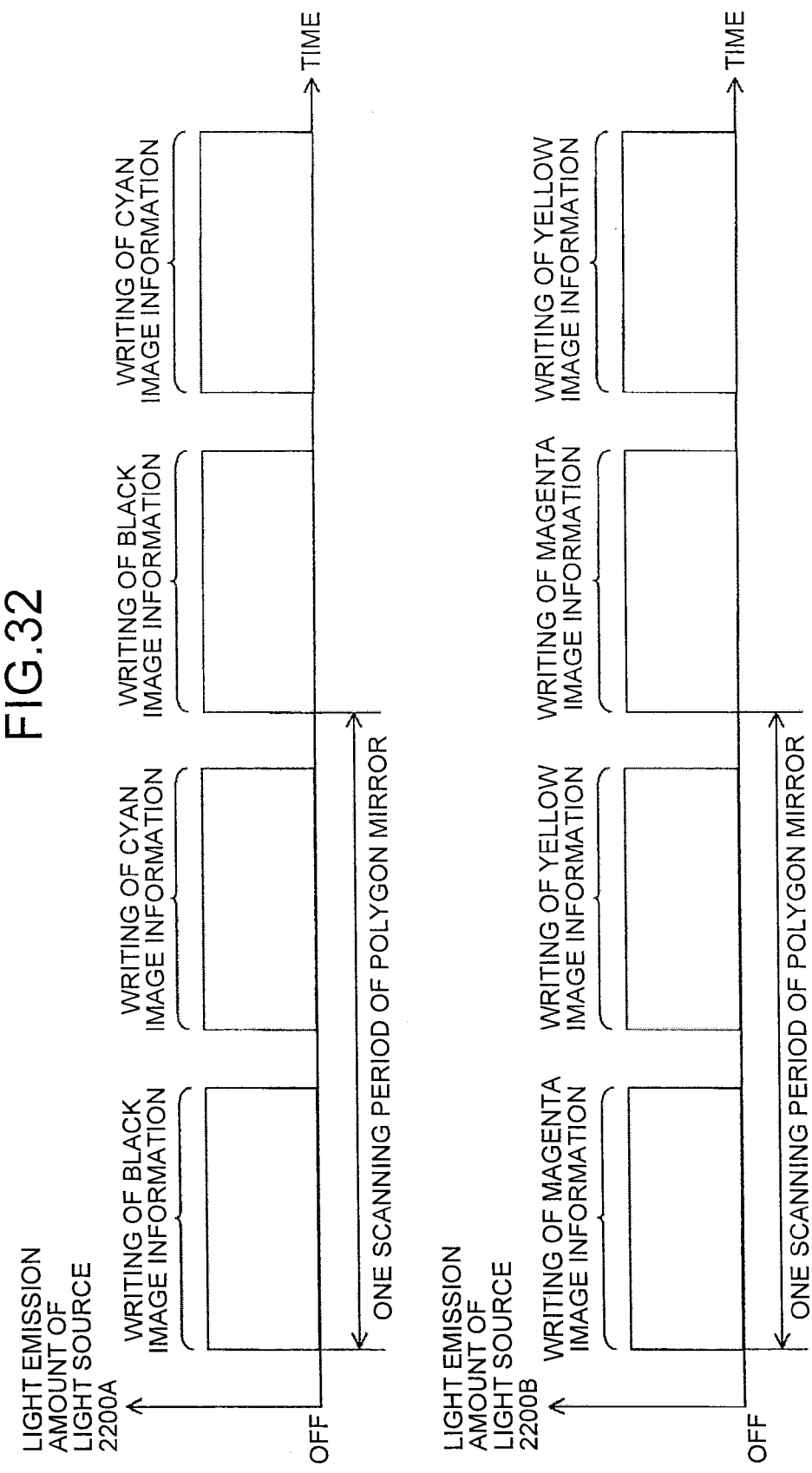

FIG.39

| CODE | LENGTH (mm) |
|---|---|
| d1 | 25.5 |
| d2 | 3.0 |
| d3 | 10.4 |
| d4 | 28.0 |
| d5 | 2.9 |
| d6 | 2.9 |
| d7 | 2.9 |
| d8 | 19.3 |
| d9+d10 | 39.3 |
| d11 | 2.0 |
| d12 | 2.0 |
| d13 | 47.4 |
| d14 | 47.4 |
| d21 | 48.0 |
| d22 | 48.0 |
| d23 | 14.0 |
| d24 | 14.0 |
| d25 | 278.0 |
| d26 | 278.0 |

OPTICAL SCANNING APPARATUS AND IMAGE FORMING APPARATUS INCLUDING A MULTI-FACETED MIRROR TO DEFLECT A LIGHT BEAM

CROSS-REFERENCE TO RELATED APPLICATIONS

The present application claims priority to and incorporates by reference the entire contents of Japanese Patent Application No. 2011-152442 filed in Japan on Jul. 11, 2011.

BACKGROUND OF THE INVENTION

1. Field of the Invention

The present invention relates to an optical scanning apparatus and an image forming apparatus. More specifically, the present invention relates to the optical scanning apparatus for scanning a target surface with light, and relates to the image forming apparatus provided with such an optical scanning apparatus.

2. Description of the Related Art

Recently, a color and high speed processing is further required for an electrophotographic image forming apparatus such as a laser printer, a laser plotter, a digital copier, a plain paper facsimile and a combination thereof including MFP (MultiFunction Peripheral). Therefore, a tandem-type image forming apparatus having a plurality of photosensitive drums (usually, four drums) as image carrying bodies is often used.

In the tandem-type image forming apparatus having four photosensitive drums which are disposed in tandem, for example, a latent image is formed on each photosensitive drum by means of the optical scanning apparatus, after each photosensitive drum is charged by a charger. Then, the latent image on each photosensitive drum is developed into component color image by means of respective color developer different from each other (e.g. Yellow toner, Magenta toner, Cyan toner and Black toner) at each developing unit. The developed component images of respective colors are transferred onto a recording medium (e.g. paper) or an intermediate transfer belt so that each component color image (e.g. toner image) is superimposed one after another. Thus, a color image is formed.

In such an image forming apparatus, by the way, if an optical output from a light source changes, a color density or image density of an output image may change. In order to address this problem, the optical scanning apparatus usually performs an APC (Auto Power Control) for controlling an output level of the light source while monitoring a part of light beam ejected from the light source by a detector such as a photo diode. Hereinafter, the part of the light beam for monitoring may be also called monitoring light beam. The detector receives the monitoring light beam to monitor the output level of the light source.

In a case that reflected light from a polygon mirror returns to the light source while performing the APC, the output level of the light source cannot be accurately controlled.

For example, Japanese Patent No. 4428920 discloses an optical scanning apparatus, in which a plurality of light beams emitted from a plurality of light source means enter different deflection surfaces. The angles formed by the light beams emitted from the plurality of light source means and entering different deflection surfaces of a polygon mirror are parallel to each other in a main scanning cross section. The light beams entering the different deflection surfaces of the polygon mirror enter the polygon mirror in the same direction in the main scanning cross section. Light amount of each of the plurality of light source means is adjusted using the light beam reflected and deflected by the deflection surface before start of image formation or after the image formation. In the light amount adjustment in each light source means, when the light amount of arbitrary light source means is adjusted, other light source means are turned off.

Japanese Patent Application Laid-open No. 2007-025165 discloses an optical scanning apparatus provided with a light source, deflection means having a plurality of stages of multiple-reflection mirrors and a common rotation shaft, light beam splitting means splitting a beam from a common light source and making the split beams enter different stages of the multiple-reflection mirrors of the deflection means, a scanning optical system guiding the beam scanned by the deflection beams to a surface to be scanned, and light receiving means detecting the beam scanned by the deflection means. In the optical scanning apparatus, the split beams from the common light source scan different surfaces to be scanned.

Japanese Patent Application Laid-open No. 2008-257169 discloses an optical scanning apparatus provided with light beam splitting means provided between a light source and deflection means. The light beam splitting means splits a beam from a light source and makes the split beams enter toward deflection means with a phase difference of approximately $\pi/2$. In the optical scanning apparatus, the deflection means has four reflecting surfaces.

In spite of technologies disclosed by the aforementioned documents, there is a need to address the problem of the reflected return light without increasing a size of the apparatus or without increasing costs.

SUMMARY OF THE INVENTION

It is an object of the present invention to at least partially solve the problems in the conventional technology.

An optical scanning apparatus scans a target surface with a light beam along a main scanning direction. The apparatus includes a light source, an optical deflector which includes a rotating multi-faceted mirror, each surface of the multi-faceted mirror acting as a reflecting surface to deflect the light beam from the light source, and a scanning optical system configured to guide the light beam deflected by the optical deflector to the target surface. An angle which is formed between the light beam toward the reflecting surface of the optical deflector and the corresponding reflecting surface and which includes a reflected light reflected from the corresponding reflecting surface is always obtuse.

An image forming apparatus includes a plurality of image carrying bodies, and an optical scanning apparatus configured to scan a surface of each of the plurality of image carrying bodies as a target surface along a main scanning direction with a light beam modulated on the basis of image information corresponding to each image carrying body. The optical scanning apparatus includes a light source, an optical deflector which includes a rotating multi-faceted mirror, each surface of the multi-faceted mirror acting as a reflecting surface to deflect the light beam from the light source, and a scanning optical system configured to guide the light beam deflected by the optical deflector to a target surface. An angle which is formed between the light beam toward the reflecting surface of the optical deflector and the corresponding reflecting surface and which includes a reflected light reflected from the corresponding reflecting surface is always obtuse.

The above and other objects, features, advantages and technical and industrial significance of this invention will be better understood by reading the following detailed descrip-

BRIEF DESCRIPTION OF THE DRAWINGS

FIG. 32 is a timing chart for explaining a writing operation by the modified example of the optical scanning apparatus;

FIG. 39 is a table showing respective lengths illustrated in FIGS. 37 to 38.

DETAILED DESCRIPTION OF THE PREFERRED EMBODIMENTS

Figure 1:
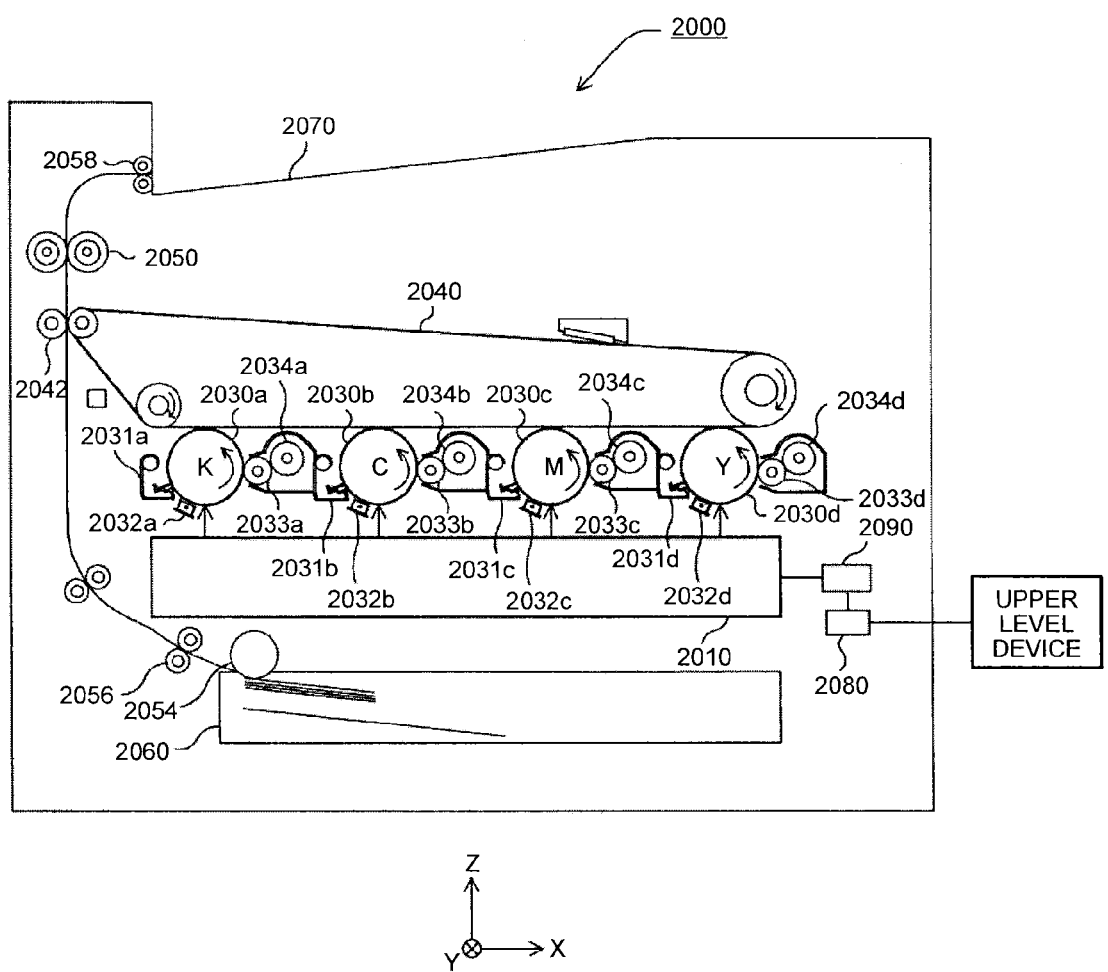
FIG. 1 is a schematic diagram illustrating a configuration of a color printer according to an embodiment of the present invention.

Hereinafter, an embodiment of the present invention will be described with reference to FIGS. 1 to 14. FIG. 1 illustrates a schematic configuration of a color printer 2000 according to the embodiment.

The color printer 2000 is a tandem-type multicolor printer which forms a full-color image by superimposing or overlapping four component colors (black, cyan, magenta and yellow). The printer is provided with an optical scanning apparatus 2010, four photosensitive drums (2030a, 2030b, 2030c and 2030d), four cleaning units (2031a, 2031b, 2031c and 2031d), four charging units (2032a, 2032b, 2032c and 2032d), four developing rollers (2033a, 2033b, 2033c and 2033d), four toner cartridges (2034a, 2034b, 2034c and 2034d), a transfer belt 2040, a transfer roller 2042, a fixing roller 2050, a feeding roller 2054, a resist roller pair (paper stop roller pair) 2056, an ejection roller 2058, a paper feed tray 2060, an ejection tray 2070, a communication control unit 2080, and a printer control unit 2090 which controls these components entirely. Those components are accommodated in a printer housing.

The communication control unit 2080 controls a two-way communication with an upper level apparatus (for example, a personal computer) through a network or the like.

The printer control unit 2090 includes a CPU, a ROM storing a program described by codes readable by the CPU and various data used for executing the program, a RAM as a work memory, an AD convertor which converts analog data into digital data, and so on. The printer control unit 2090 controls each unit in response to requests from an upper level apparatus and sends image information from the upper level apparatus to the optical scanning apparatus 2010.

The photosensitive drum 2030a, the charging unit 2032a, the developing roller 2033a, the toner cartridge 2034a, and the cleaning unit 2031a are used as a group and constitute an image forming station to form a black image. Hereinafter, this station may be also called "K station" for sake of simplicity.

The photosensitive drum 2030b, the charging unit 2032b, the developing roller 2033b, the toner cartridge 2034b, and the cleaning unit 2031b are used as a group and constitute an image forming station to form a cyan image. Hereinafter, this station may be also called "C station" for sake of simplicity.

The photosensitive drum 2030c, the charging unit 2032c, the developing roller 2033c, the toner cartridge 2034c, and the cleaning unit 2031c are used as a group and constitute an image forming station to form a magenta image. Hereinafter, this station may be also called "M station" for sake of simplicity.

The photosensitive drum 2030d, the charging unit 2032d, the developing roller 2033d, the toner cartridge 2034d, and the cleaning unit 2031d are used as a group and constitute an image forming station to form a yellow image. Hereinafter, this station may be also called "Y station" for sake of simplicity.

Each photosensitive drum has a photosensitive layer which is formed on each surface of each drum. Namely, the surface of each drum is to be a scanning target surface. Incidentally, each photosensitive drum rotates in a direction shown by each arrow in a plane of FIG. 1 by a rotating mechanism.

In the following description, a direction along the longitudinal direction (rotation axis direction) of each photosensitive drum is referred to as a Y-axis direction, and a direction along a tandem alignment direction of the four photosensitive drums is referred to as an X-axis direction in an XYZ three-dimensional orthogonal coordinate system.

Each charging unit uniformly charges the surface of the corresponding photosensitive drum.

The optical scanning apparatus 2010 scans the charged surface of the corresponding photosensitive drum with four light beams modulated for each color on the basis of each component color image information (black image information, cyan image information, magenta image information, and yellow image information) from the printer control unit 2090. With this configuration, a latent image corresponding to the image information is formed on the surface of each photosensitive drum. The latent image thus formed is moved toward the corresponding developing roller in accordance with the rotation of the photosensitive drum. The detail of the optical scanning apparatus 2010 will be described later.

In accordance with the rotation of each developing roller, toner from the corresponding toner cartridge is thinly and uniformly coated onto the surface of the developing roller. When the toner on the surface of each developing roller contacts the surface of the corresponding photosensitive drum, the toner transfers only to a portion of the surface irradiated with light, and adheres to the portion. Namely, each developing roller makes toner adhere to the latent image formed on the surface of the corresponding photosensitive drum to visualize the latent image. The image adhered with toner (toner image) is moved toward the transfer belt 2040 in accordance with the rotation of the photosensitive drum.

The yellow, magenta, cyan, and black toner images are transferred in sequence onto the transfer belt 2040 at a predetermined timing to be superimposed, and, thus, to form a color image.

The paper feed tray 2060 stores therein recording sheets (e.g. paper). The feeding roller 2054 is disposed near the paper feed tray 2060. The feeding roller 2054 takes the recording sheets one by one from the paper feed tray 2060 and conveys the recording sheet to the resist roller pair 2056. The resist roller pair 2056 feeds the recording sheet toward a gap between the transfer belt 2040 and the transfer roller 2042 at a predetermined timing. With this configuration, the color image on the transfer belt 2040 is transferred onto the recording sheet. The recording sheet transferred with the color image is conveyed to the fixing roller 2050.

At the fixing roller 2050, heat and pressure are applied to the recording sheet, whereby toner is fixed onto the recording sheet. The recording sheet to which the toner is fixed is conveyed to the discharge tray 2070 through the discharging roller 2058 and sequentially stacked on the discharge tray 2070.

Each cleaning unit removes toner (residual toner) remaining on the surface of the corresponding photosensitive drum. The surface of the photosensitive drum after the residual toner is removed returns again to a position facing the corresponding charging unit.

Next, the detail of the optical scanning apparatus 2010 will be described.

Figure 2:
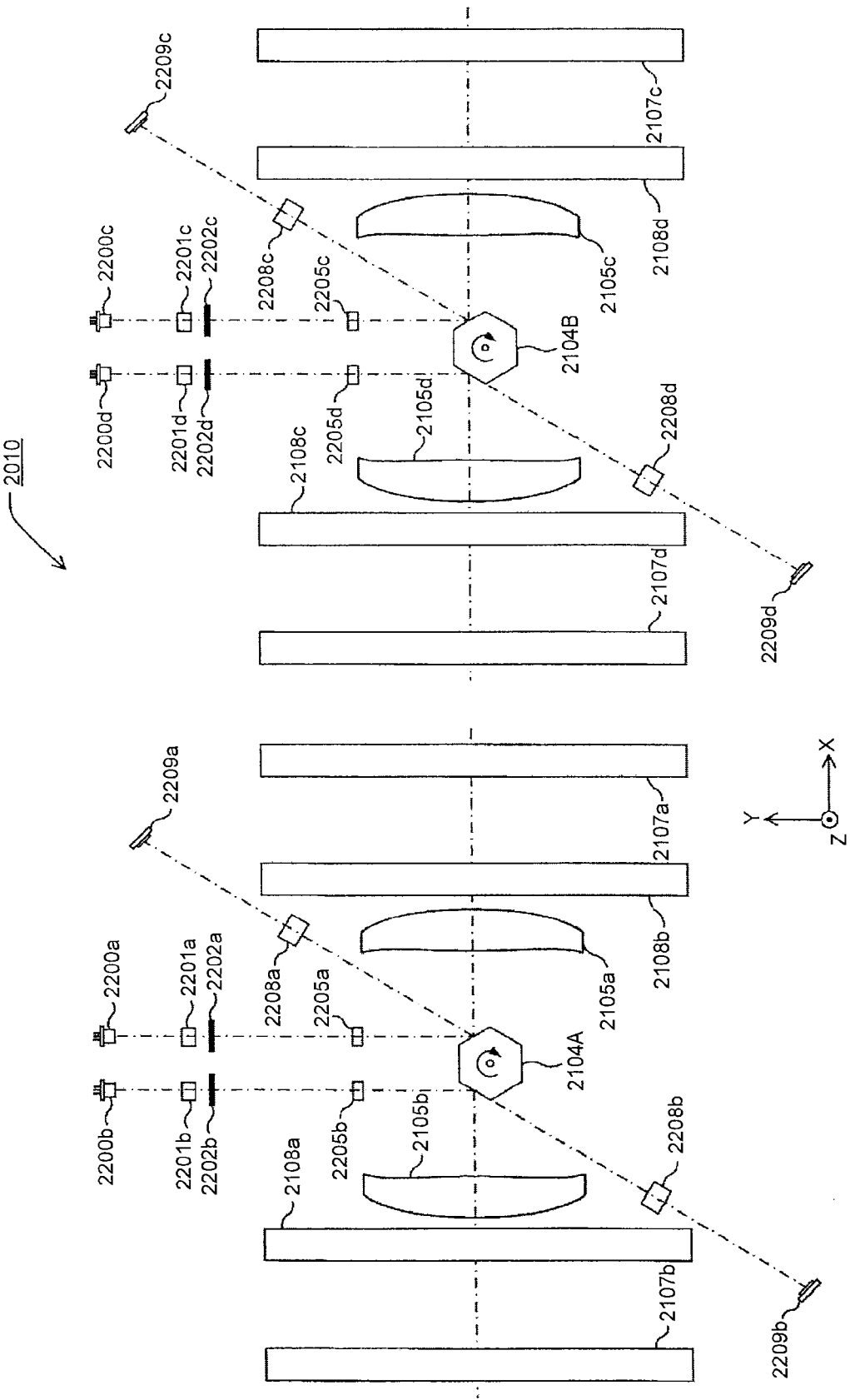
FIG. 2 is a schematic diagram for explaining a configuration of an optical scanning apparatus illustrated in FIG. 1.
Figure 3:
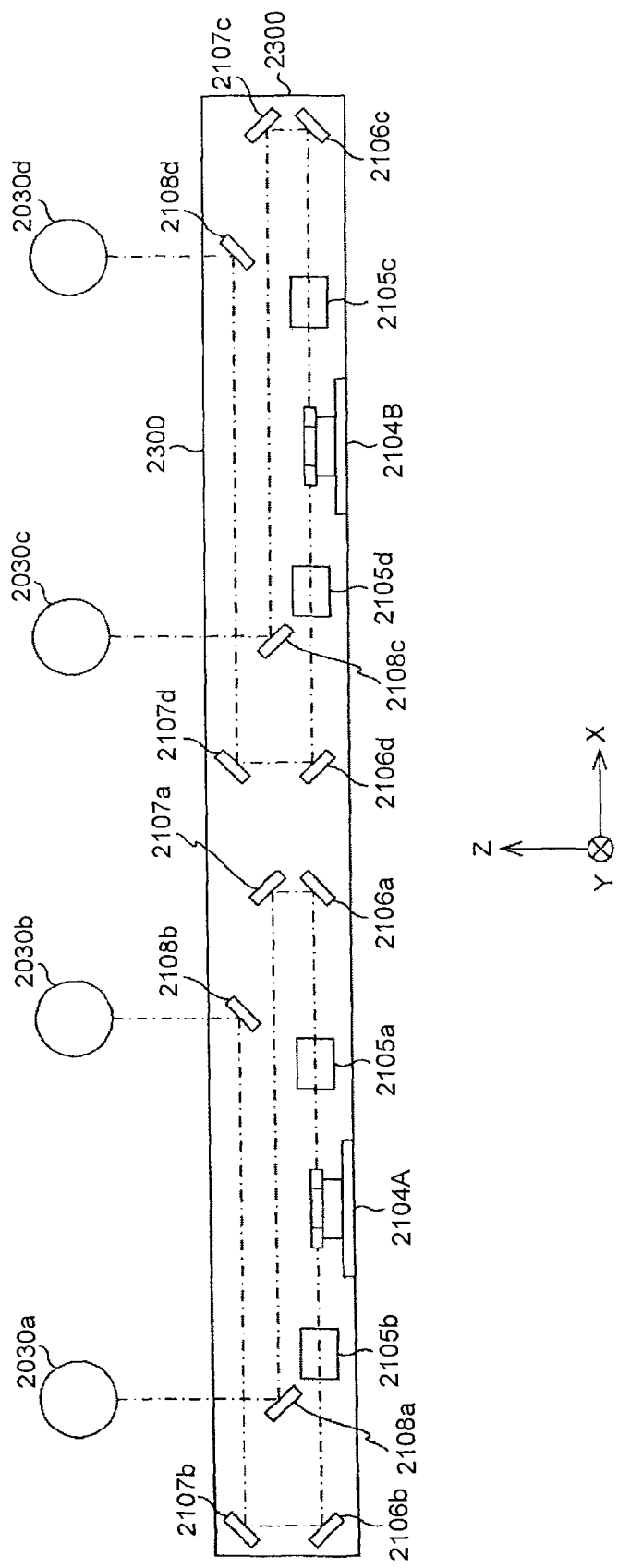
FIG. 3 is another schematic diagram for explaining a configuration of the optical scanning apparatus illustrated in FIG. 1.

As illustrated in FIGS. 2 and 3 by way of example, the optical scanning apparatus 2010 includes four light sources (2200a, 2200b, 2200c, and 2200d), four coupling lenses (2201a, 2201b, 2201c, and 2201d), four aperture plates (2202a, 2202b, 2202c, and 2202d), four cylindrical lenses (2205a, 2205b, 2205c, and 2205d), four synchronous lenses (2208a, 2208b, 2208c, and 2208d), four synchronous detection sensors (2209a, 2209b, 2209c, and 2209d), two polygon mirrors (2104A and 2104B), four scanning lenses (2105a, 2105b, 2105c, and 2105d), twelve reflecting mirrors (so-called "orikaeshi" mirrors) (2106a, 2106b, 2106c, 2106d, 2107a, 2107b, 2107c, 2107d, 2108a, 2108b, 2108c, and 2108d), a scanning control unit, and so on. Those components are accommodated in an optical housing 2300 (see FIG. 3).

The light source 2200a, the coupling lens 2201a, the aperture plate 2202a, the cylindrical lens 2205a, the scanning lens 2105a, the three reflecting mirrors (2106a, 2107a, and 2108a), the synchronous lens 2208a, and the synchronous detection sensor 2209a are optical members for forming a latent image on the photosensitive drum 2030a.

The light source 2200b, the coupling lens 2201b, the aperture plate 2202b, the cylindrical lens 2205b, the scanning lens 2105b, the three reflecting mirrors (2106b, 2107b, and 2108b), the synchronous lens 2208b, and the synchronous detection sensor 2209b are optical members for forming a latent image on the photosensitive drum 2030b.

The light source 2200c, the coupling lens 2201c, the aperture plate 2202c, the cylindrical lens 2205c, the scanning lens 2105c, the three reflecting mirrors (2106c, 2107c, and 2108c), the synchronous lens 2208c, and the synchronous detection sensor 2209c are optical members for forming a latent image on the photosensitive drum 2030c.

The light source 2200d, the coupling lens 2201d, the aperture plate 2202d, the cylindrical lens 2205d, the scanning lens 2105d, the three reflecting mirrors (2106d, 2107d, and 2108d), the synchronous lens 2208d, and the synchronous detection sensor 2209d are optical members for forming a latent image on the photosensitive drum 2030d.

Hereinafter, for sake of simplicity, with regard to each optical member, a direction corresponding to a main scanning direction may be called "a main scanning corresponding direction" and a direction corresponding to a sub scanning direction may be called "a sub scanning corresponding direction".

The respective light sources are arranged separately in the X-axis direction, and all the light sources emit light beams in −Y direction.

Each light source includes a semiconductor laser (LD) mounted on a circuit board. On the circuit board, there is mounted a monitoring photodetector for receiving the light beam emitted backward from the light source. The monitoring photodetector outputs a signal corresponding to the received light amount to the scanning control unit.

The scanning control unit performs the APC for each light source, on the basis of the output signal from the monitoring photodetector for each light source.

Each coupling lens, which is disposed on the light path of the light beam emitted from the corresponding light source, produces a substantial parallel beam from the light beam from the light source.

Each aperture plate has an aperture for reshaping the light beam from the corresponding coupling lens.

The cylindrical lenses 2205a and 2205b provide an image with the light beam passed through the aperture of the corresponding aperture plate, in the vicinity of the deflecting reflection surface of the polygon mirror 2104A in the Y axis direction.

The cylindrical lenses 2205c and 2205d provide an image with the light beam passed through the aperture of the corresponding aperture plate, in the vicinity of the deflecting reflection surface of the polygon mirror 2104B in the Y axis direction.

An optical system disposed on the light path between the light source and the polygon mirror is called a pre-deflector optical system. In this embodiment, four pre-deflector optical systems are disposed so that their light axes are parallel to each other. In this case, these four pre-deflector optical systems may be an identical pre-deflector optical system. Thereby, the cost can be reduced. Usually, optical elements in the pre-deflector optical system often require an adjustment of their positions or postures. However, in this embodiment, since optical elements in the system are oriented in the same direction, the adjustment of their positions or postures can be simplified. For example, an adjustment jig or an adjustment process can be simplified.

All the light paths of the light beams toward the polygon mirror are parallel to the Y axis direction. In this case, it is possible to avoid interference between the pre-deflector optical system and the reflecting mirrors. It is also possible to avoid interference between the pre-deflector optical system and its adjustment jigs.

Each polygon mirror is comprised of a six-faceted mirror capable of rotating around an axis parallel to the Z axis direction. Each mirror surface of this six-faceted mirror acts as the deflecting reflection surface.

The light beam from the cylindrical lens 2205a, which may be called "the light beam LBa", and the light beam from the cylindrical lens 2205b, which may be called "the light beam LBb", enter each deflecting reflection surface different from each other. The light beam LBa is deflected toward the "+X" side with respect to the polygon mirror 2104A. The light beam LBb is deflected toward the "−X" side with respect to the polygon mirror 2104A.

The light beam from the cylindrical lens 2205c, which may be called "the light beam LBc", and the light beam from the cylindrical lens 2205d, which may be called "the light beam LBd", enter each deflecting reflection surface different from each other. The light beam LBc is deflected toward the "+X" side with respect to the polygon mirror 2104B. The light beam LBd is deflected toward the "−X" side with respect to the polygon mirror 2104B.

Specifically, a distance in the X axis direction between LBa and LBb, or between LBc and LBd, is 20 mm, when a radius of an incircle of the six-faceted polygon mirror is 13 mm. Also, the distance in the X axis direction between LBa and LBb, or between LBc and LBd, is 20 mm, when a radius of an incircle of the four-faceted polygon mirror is 8 mm.

The light beam LBa deflected by the polygon mirror 2104A passes through the scanning lens 2105a. Then, the light beam LBa is returned toward the opposite direction with regard to the X axis direction by means of two reflecting mirrors 2106a and 2107a. The returned light beam LBa is directed to the photosensitive drum 2030a by means of the reflecting mirror 2108a disposed at the "−X" side of the polygon mirror 2104A with regard to the X axis direction.

The light beam LBb deflected by the polygon mirror 2104A passes through the scanning lens 2105b. Then, the light beam LBb is returned toward the opposite direction with regard to the X axis direction by means of two reflecting mirrors 2106b and 2107b. The returned light beam LBb is directed to the photosensitive drum 2030b by means of the reflecting mirror 2108b disposed at the "+X" side of the polygon mirror 2104A with regard to the X axis direction.

The light beam LBc deflected by the polygon mirror 2104B passes through the scanning lens 2105c. Then, the light beam LBc is returned toward the opposite direction with regard to the X axis direction by means of two reflecting mirrors 2106c and 2107c. The returned light beam LBc is directed to the photosensitive drum 2030c by means of the reflecting mirror 2108c disposed at the "−X" side of the polygon mirror 2104B with regard to the X axis direction.

The light beam LBd deflected by the polygon mirror 2104B passes through the scanning lens 2105d. Then, the light beam LBd is returned toward the opposite direction with regard to the X axis direction by means of two reflecting mirrors 2106d and 2107d. The returned light beam LBd is directed to the photosensitive drum 2030d by means of the reflecting mirror 2108d disposed at the "+X" side of the polygon mirror 2104B with regard to the X axis direction.

The light spot on each photosensitive drum moves in a longitudinal direction of the photosensitive drum (the Y axis direction) in accordance with the rotation of the polygon mirror. This moving direction of the light spot corresponds to the "main scanning direction". And the rotating direction of the photosensitive drum corresponds to the "sub scanning direction".

An optical system disposed on the light path between the polygon mirror and the photosensitive drum is called a "scanning optical system".

In this embodiment, the scanning optical system for the K station is comprised of the scanning lens 2105a and three reflecting mirrors 2106a, 2107a and 2108a. Similarly, the scanning optical system for the C station is comprised of the scanning lens 2105b and three reflecting mirrors 2106b, 2107b and 2108b.

Similarly, the scanning optical system for the M station is comprised of the scanning lens 2105c and three reflecting mirrors 2106c, 2107c and 2108c. Similarly, the scanning optical system for the Y station is comprised of the scanning lens 2105d and three reflecting mirrors 2106d, 2107d and 2108d.

Incidentally, a scanning area in the main scanning direction where the image information is written onto each photosensitive drum may be also called "effective scanning area", "image forming area", "effective image area" and the like.

In this embodiment, the light beam for scanning an area within the effective scanning area is always deflected by one deflecting reflection surface of the polygon mirror. This method is called an "UnderField" scanning. This method can reduce a variation in the beam spot diameter or the light amount on the photosensitive drum with regard to the main scanning direction, which may be observed in an "OverField" scanning. It is also possible to reduce a variation in a writing start point or a writing end point (hereinafter, it may be also called "vertical line fluctuation"), even if there is any surface accuracy error or variation among deflecting reflection surfaces of the polygon mirror.

Figure 4:
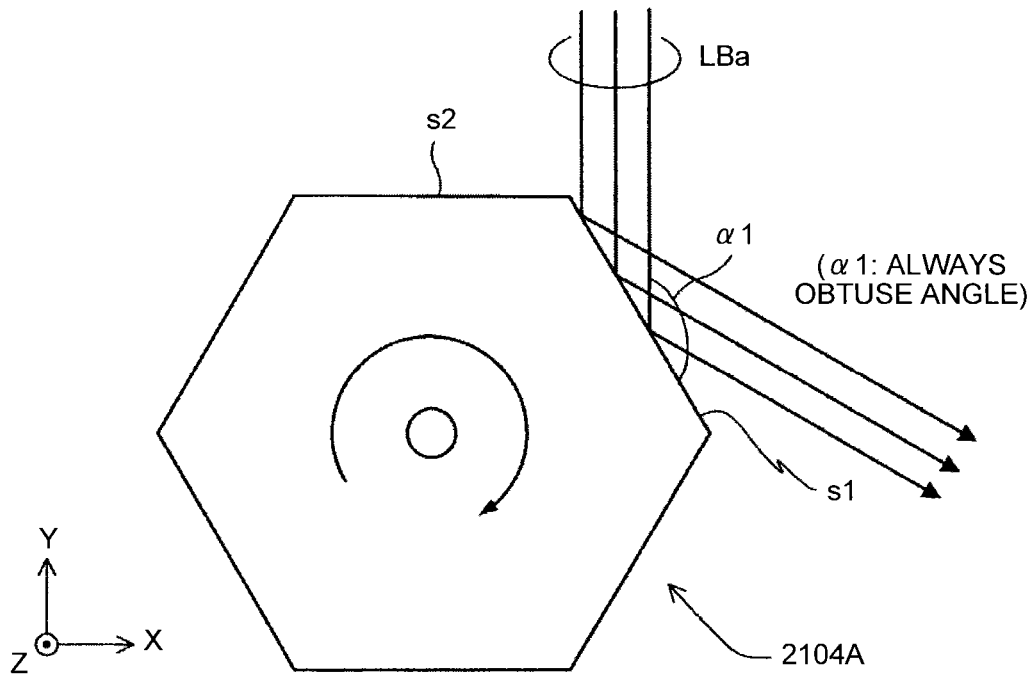
FIG. 4 is a schematic diagram for explaining an angle formed between light beams toward a deflecting reflection surface of a polygon mirror and the deflecting reflection surface and showing reflected light.

As one example illustrated in FIG. 4, the position of the light source is arranged so that the light beam does not enter a deflecting reflection surface with the incident angle becoming zero (the deflecting reflection surface s2 in the timing illustrated in FIG. 4), when the light beam enters the polygon mirror. Namely, it is set so that an angle $\alpha 1$, which is formed between a light beam toward a deflecting reflection surface and the corresponding deflecting reflection surface and which includes a reflected light from the corresponding deflecting reflection surface, is always obtuse or blunt. In this case, the light beam deflected by the polygon mirror does not returned to the light source.

Figure 5:
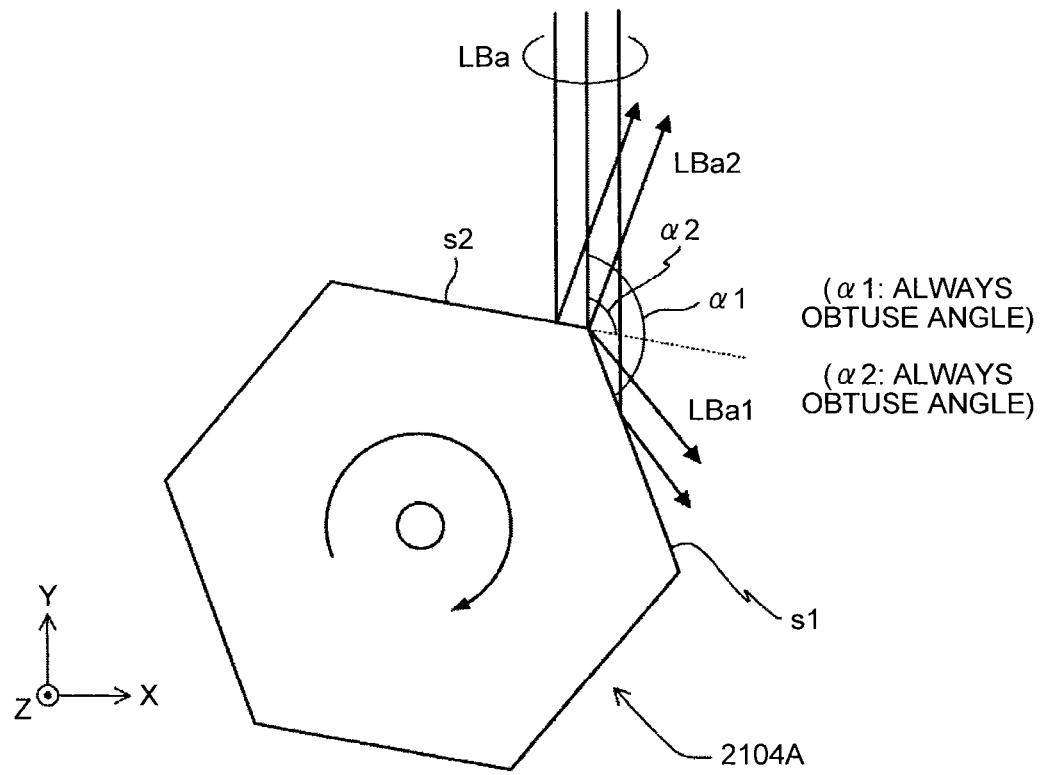
FIG. 5 is another schematic diagram for explaining an angle formed between light beams toward a deflecting reflection surface of a polygon mirror and the deflecting reflection surface and showing reflected light.

As one example, FIG. 5 illustrates a state immediately after the state illustrated in FIG. 4. As time goes by from the state of FIG. 4, the light beam becomes gradually to enter the deflecting reflection surface s2 next to the deflecting reflection surface s1. However, the deflecting reflection surface s2 is inclined from the state illustrated in FIG. 4. Namely, the surface s2 is not longer the state involving the incident angle zero which is the state where the reflected light returns to the light source. Therefore, the light beam LBa2 does not return to the light source, even if it is reflected by the deflecting reflection surface s2, as illustrated in FIG. 5.

Incidentally, as illustrated in FIG. 5, it is set so that the angle $\alpha 1$, which is formed between the light beam LBa1 toward the deflecting reflection surface s1 and the deflecting reflection surface s1 and which includes the reflected light from the deflecting reflection surface s1, is always obtuse. Also, it is set so that the angle $\alpha 2$, which is formed between the light beam LBa2 toward the deflecting reflection surface s2 and the deflecting reflection surface s2 and which includes the reflected light from the deflecting reflection surface s2, is always obtuse.

Figure 6:
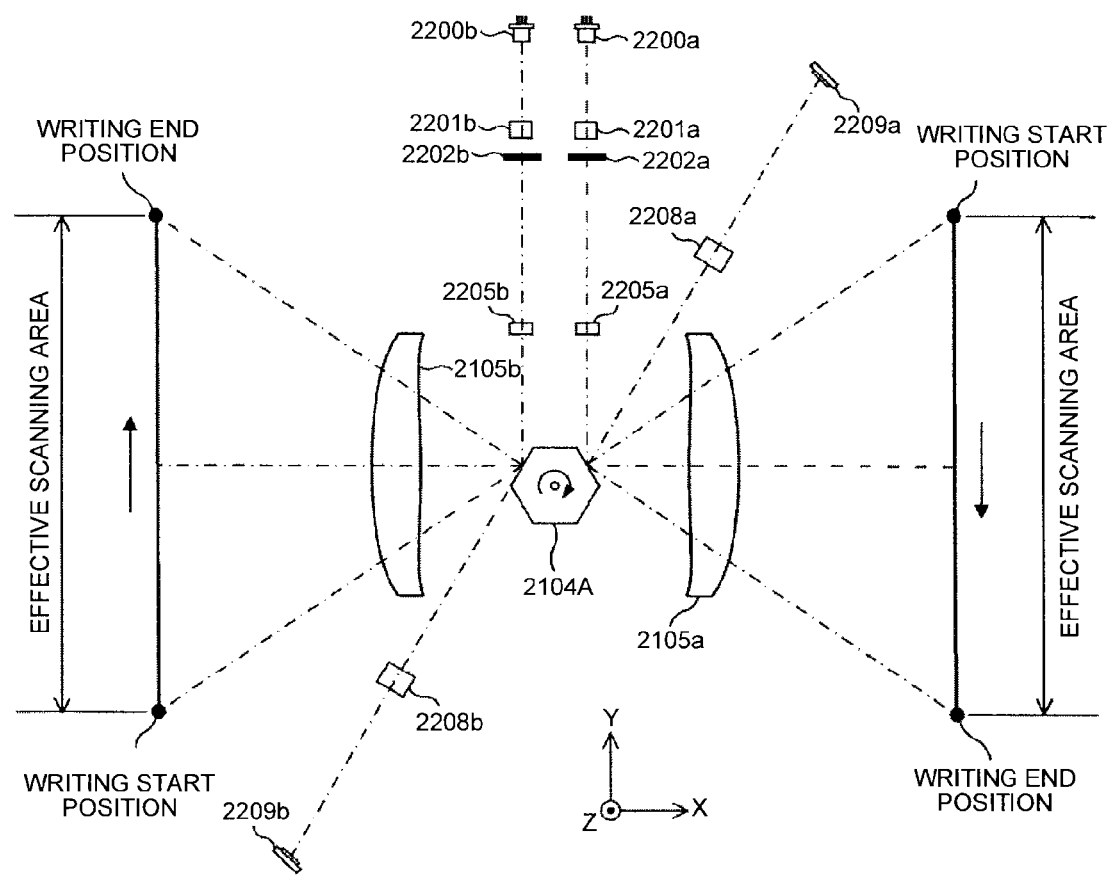
FIG. 6 is a schematic diagram for explaining an effective scanning area in each station.

As illustrated in FIG. 6, the light beam LBa, which is deflected by the polygon mirror 2104A and which is a light beam before starting a writing in the effective scanning area on the photosensitive drum 2030a, enters the synchronous detection sensor 2209a via the synchronous lens 2208a. In FIG. 6, for sake of simplicity, the return of the light path by reflecting mirrors is omitted.

The light beam LBb, which is deflected by the polygon mirror 2104A and which is a light beam before starting a writing in the effective scanning area on the photosensitive drum 2030b, enters the synchronous detection sensor 2209b via the synchronous lens 2208b.

Figure 7:
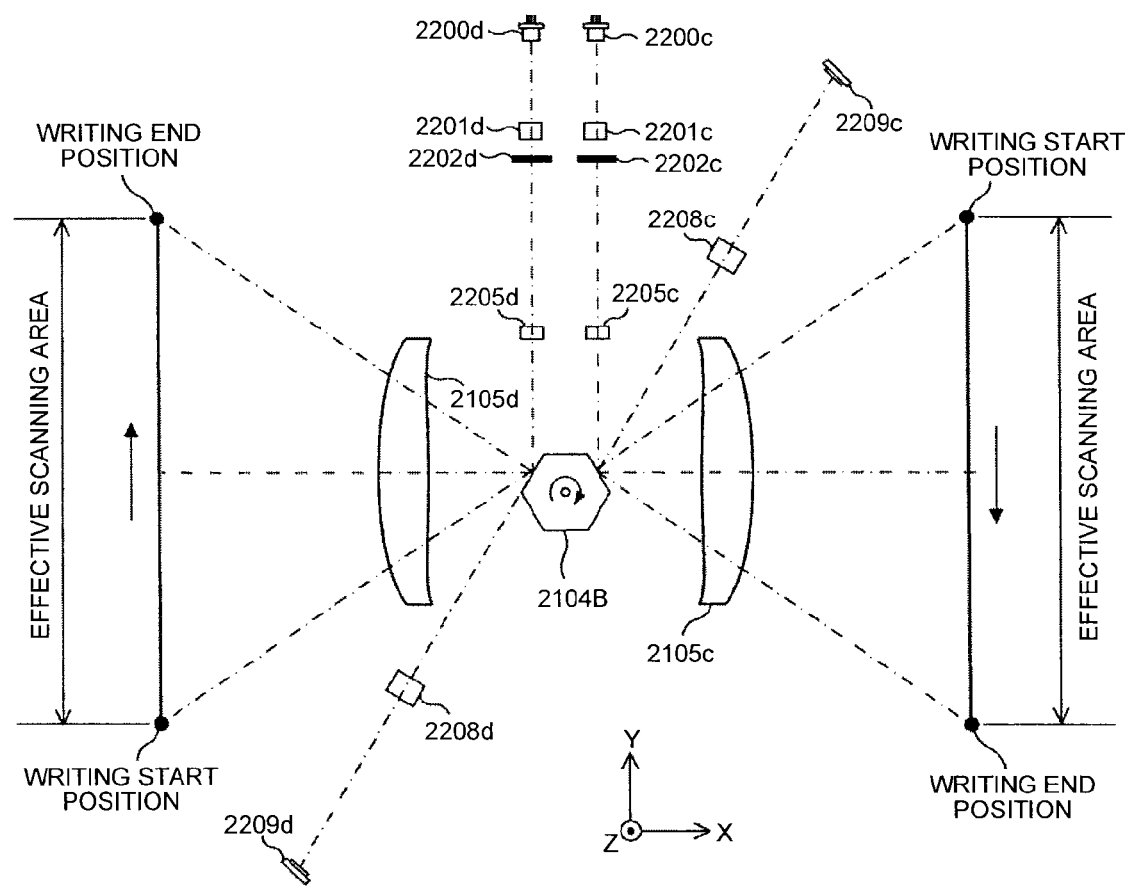
FIG. 7 is another schematic diagram for explaining an effective scanning area in each station.

As illustrated in FIG. 7, the light beam LBc, which is deflected by the polygon mirror 2104B and which is a light beam before starting a writing in the effective scanning area on the photosensitive drum 2030c, enters the synchronous detection sensor 2209c via the synchronous lens 2208c. In FIG. 7, for sake of simplicity, the return of the light path by reflecting mirrors is omitted.

The light beam LBd, which is deflected by the polygon mirror 2104B and which is a light beam before starting a writing in the effective scanning area on the photosensitive drum 2030d, enters the synchronous detection sensor 2209d via the synchronous lens 2208d.

The scanning control unit determines a timing to start a writing onto the photosensitive drum 2030a, on the basis of the output signal from the synchronous detection sensor 2209a, and determines a timing to start a writing onto the photosensitive drum 2030b, on the basis of the output signal from the synchronous detection sensor 2209b.

Similarly, the scanning control unit determines a timing to start a writing onto the photosensitive drum 2030c, on the basis of the output signal from the synchronous detection sensor 2209c, and determines a timing to start a writing onto the photosensitive drum 2030d, on the basis of the output signal from the synchronous detection sensor 2209d.

An optical system disposed for determining the timing to start the writing onto the photosensitive drum is also called a "synchronous detection optical system".

Figure 8:
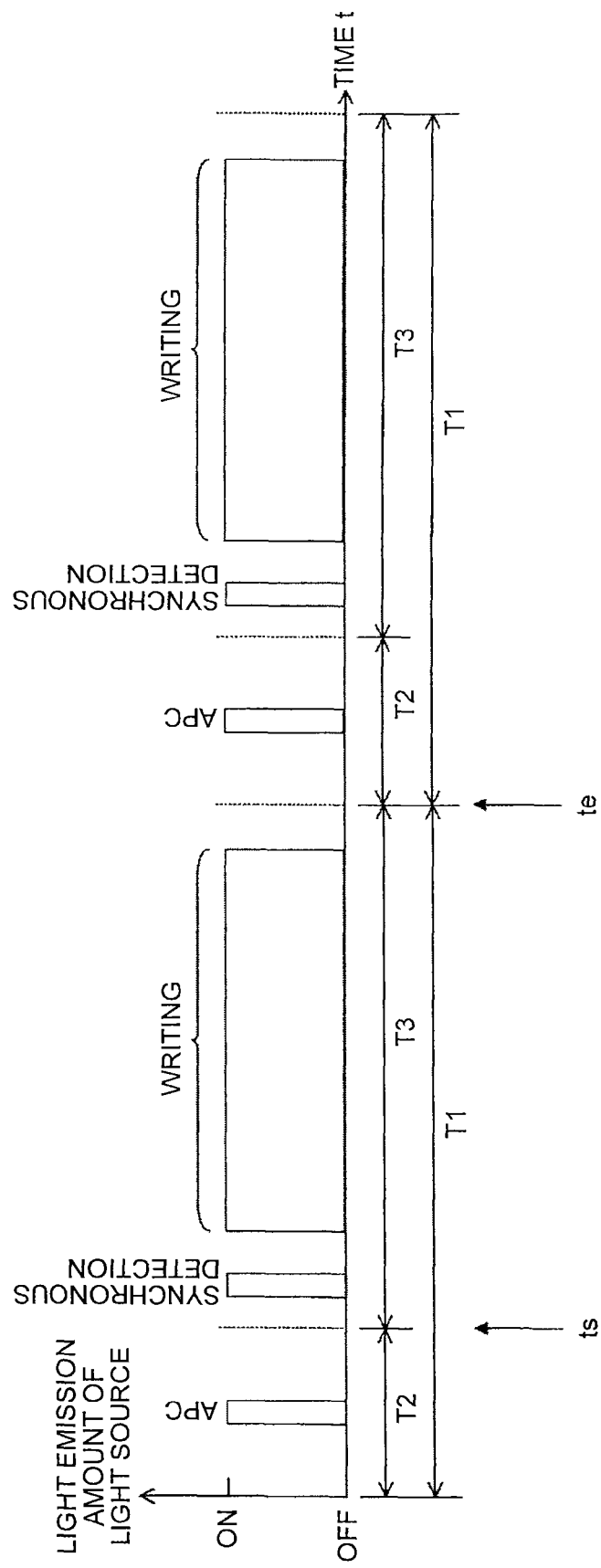
FIG. 8 is a timing chart for explaining a drive control of the light source by a scanning control unit.

FIG. 8 illustrates timings of an APC, a synchronous detection and a writing in one station. The symbol "T1" in FIG. 8 means a time period required for one scanning, and hereinafter may be also called a "scanning period". When the polygon mirror is comprised of the six-faceted rotating mirror, the scanning period corresponds to a time period required for the polygon mirror to rotate by 60 degrees. When the polygon mirror is comprised of the four-faceted rotating mirror, the scanning period corresponds to a time period required for the polygon mirror to rotate by 90 degrees.

The symbol "T2" in FIG. 8 means a time period maintaining a state where the light beam enters two deflecting reflection surfaces of the polygon mirror (see FIG. 5). The symbol "T3" in FIG. 8 means a time period where the light beam enters one deflecting reflection surface of the polygon mirror. A timing transiting from T2 to T3 refers to a timing "ts". A timing transiting from T3 to T2 refers to a timing "te". In other words, the timing "ts" refers to a timing transiting from a state that the light beam enters two deflecting reflection surfaces to a state that the light beam enters one deflecting reflection surface. The timing "te" refers to a timing transiting from a state that the light beam enters one deflecting reflection surface to a state that the light beam enters two deflecting reflection surfaces.

In this embodiment, the APC is performed at a timing included in T2.

Figure 9:
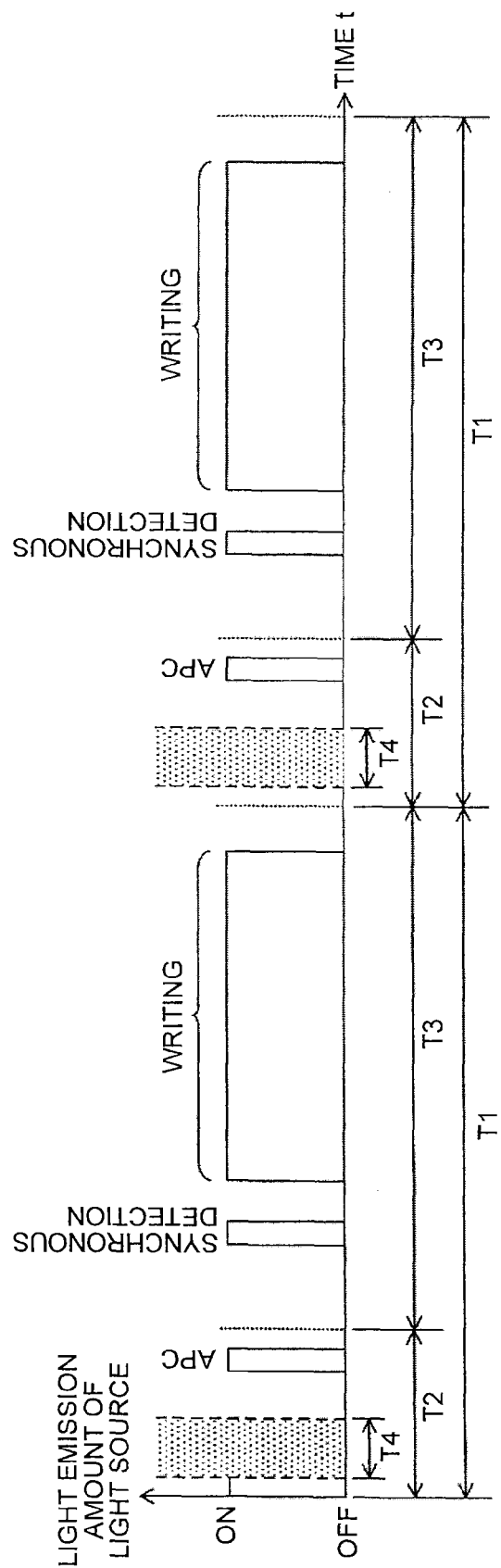
FIG. 9 is a timing chart for explaining a comparative example.

As a comparative example, FIG. 9 illustrates a timing chart of a conventional apparatus in which the reflected light returns to the light source. The symbol "T4" in FIG. 9 means a time period where the light beam enters a deflecting reflection surface with the incident angle being zero and thereby the reflected light returns to the light source. In this case, the output signal from the monitoring photodetector becomes unstable. Thereby, the APC cannot be performed. Therefore, there is a need to perform the APC at a timing other than T4. In view of time required for the APC and the synchronous detection, or considering the positional error of the optical elements, consequently, there is less time available for the writing.

Figure 10:
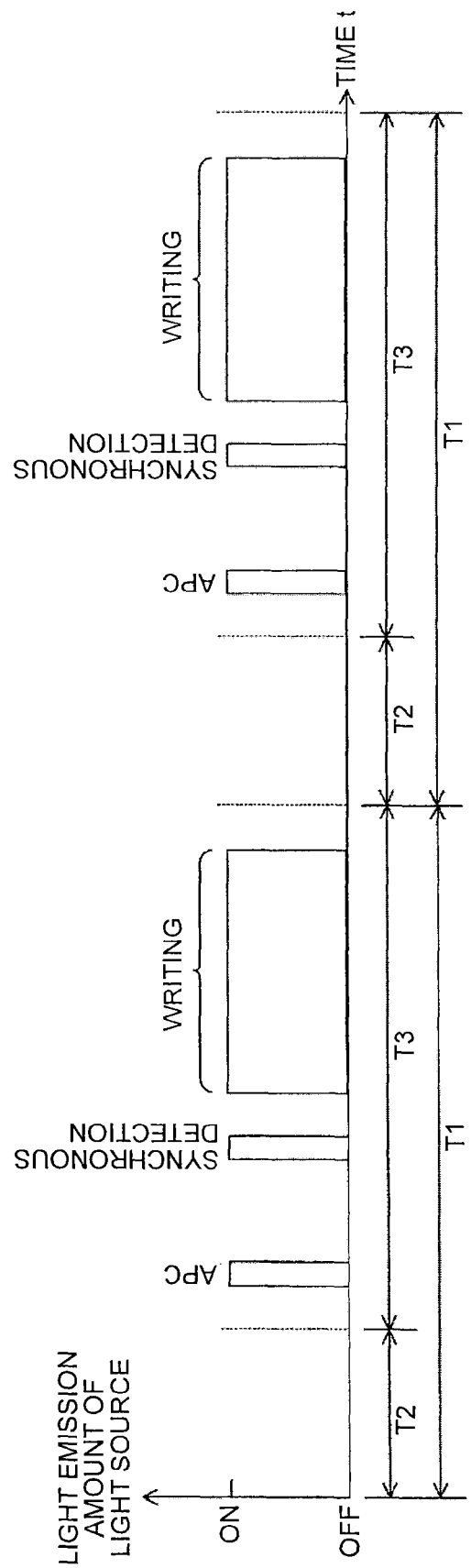
FIG. 10 is a timing chart for explaining a case where APC is performed in a time range other than T2.

As one example illustrated in FIG. 10, if the APC is performed at timing other than T2, there is less time available for the writing.

The synchronous detection may be performed at timing within T2. In this case, however, the aforementioned vertical line fluctuation may be promoted, if there is any surface accuracy error or variation among two deflecting reflection surfaces, since the light beam enters two deflecting reflection surfaces of the polygon mirror. Therefore, in a case that the vertical line fluctuation must be concerned, the synchronous detection is preferably performed at timing other than T2. Namely, the synchronous detection is preferably performed with the light beam reflected from one deflecting reflection surface.

Figure 11A:
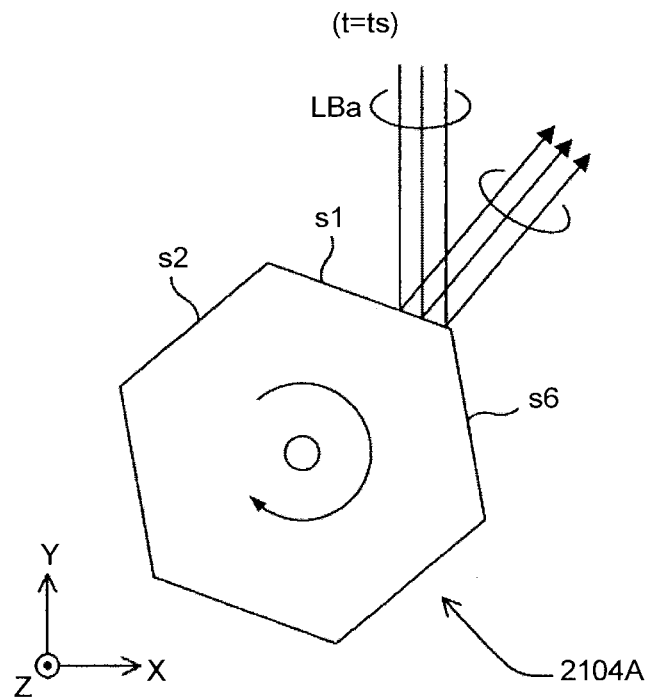
FIG. 11A is a schematic diagram for explaining a relationship between (i) a light beam toward a deflecting reflection surface and (ii) the deflecting reflection surface when t=ts.

In this embodiment, it is set so that the light beam entering the deflecting reflection surface s1 is reflected at an edge of the deflecting reflection surface s1 adjacent to the deflecting reflection surface s6 as illustrated FIG. 11A at timing when t=ts. And, it is set so that the light beam entering the deflecting reflection surface s1 is reflected at an edge of the deflecting reflection surface s1 adjacent to the deflecting reflection surface s2 as illustrated in FIG. 11B at timing when t=te.

Figure 12A:
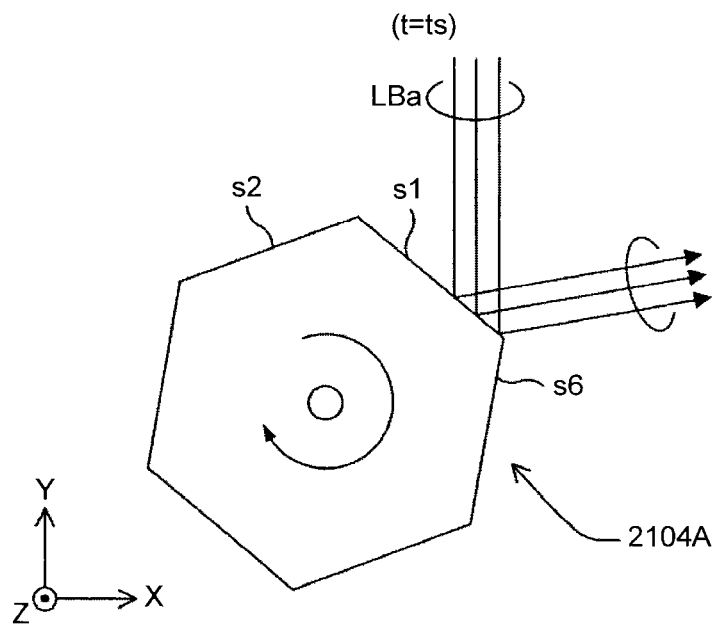
FIG. 12A is a schematic diagram for explaining a modified example.
Figure 12B:
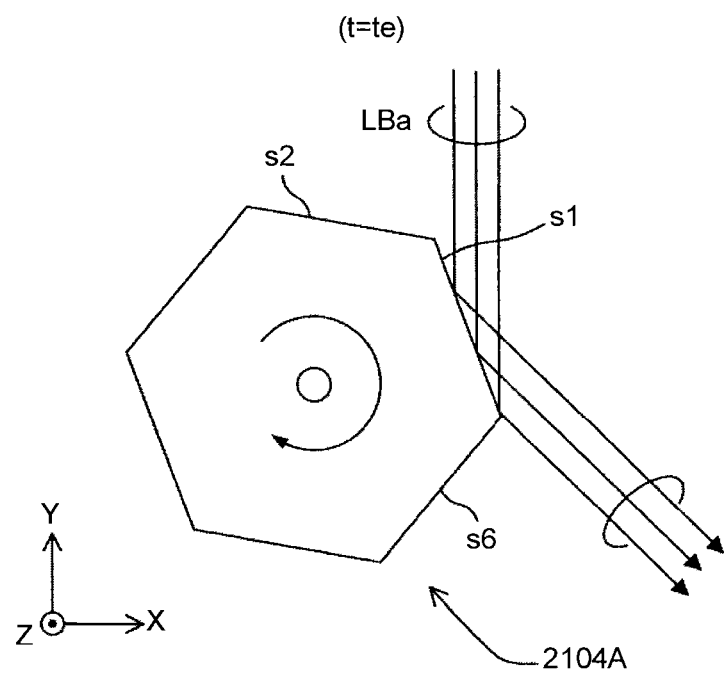
FIG. 12B is another schematic diagram for explaining a modified example.

As a modified example, FIG. 12A and FIG. 12B show a case that the light beam is reflected at an edge of the deflecting reflection surface s1 adjacent to the deflecting reflection surface s6 at timing even when t=te.

In comparison with the modified example, the present embodiment makes it possible to maintain a longer time for T3. Furthermore, the incident angle of the light beam with respect to the deflecting reflection surface at timing when t=te is smaller. Thereby, it becomes invulnerable to the variation in the surface accuracy of the deflecting reflection surface. The smaller incident angle also brings an advantage that a deviation of the reflection ratio on the deflecting reflection surface depending on a position in the Y axis direction (shading) can be reduced, when a time period for scanning the effective scanning area is constant (a field angle is constant) in both the present embodiment and the modified example. In comparison with the modified example, the present invention also brings an advantage that an area of use on the deflecting reflection surface is narrow, and thereby it is easy to narrow the beam spot diameter on the target surface in the main scanning direction by expanding the light beam diameter in the Y axis direction.

Figure 11B:
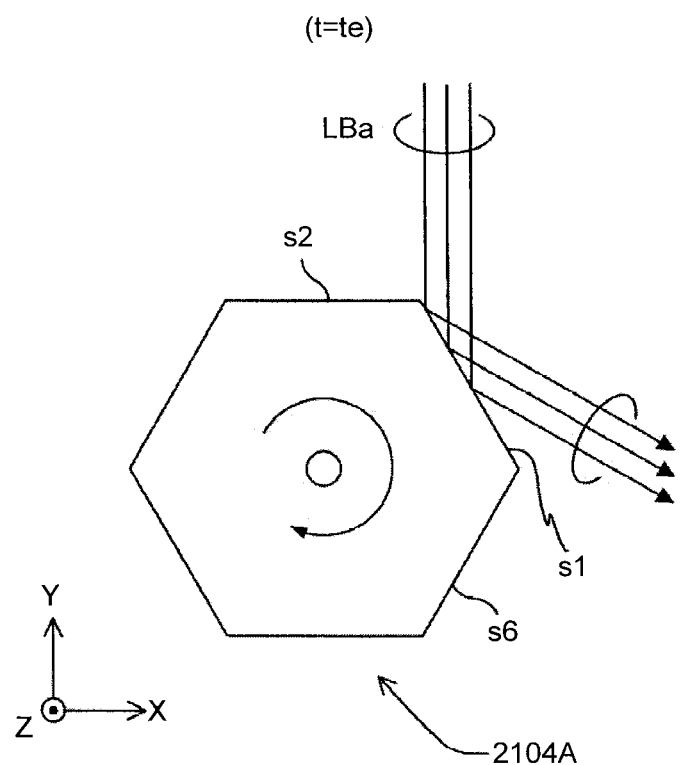
FIG. 11B is a schematic diagram for explaining a relationship between (i) a light beam toward a deflecting reflection surface and (ii) the deflecting reflection surface when t=te.

Incidentally, the incident position of the light beam at timing when t=te may be a position between the position illustrated in FIG. 11B and the position illustrated in FIG. 12B.

Figure 13:
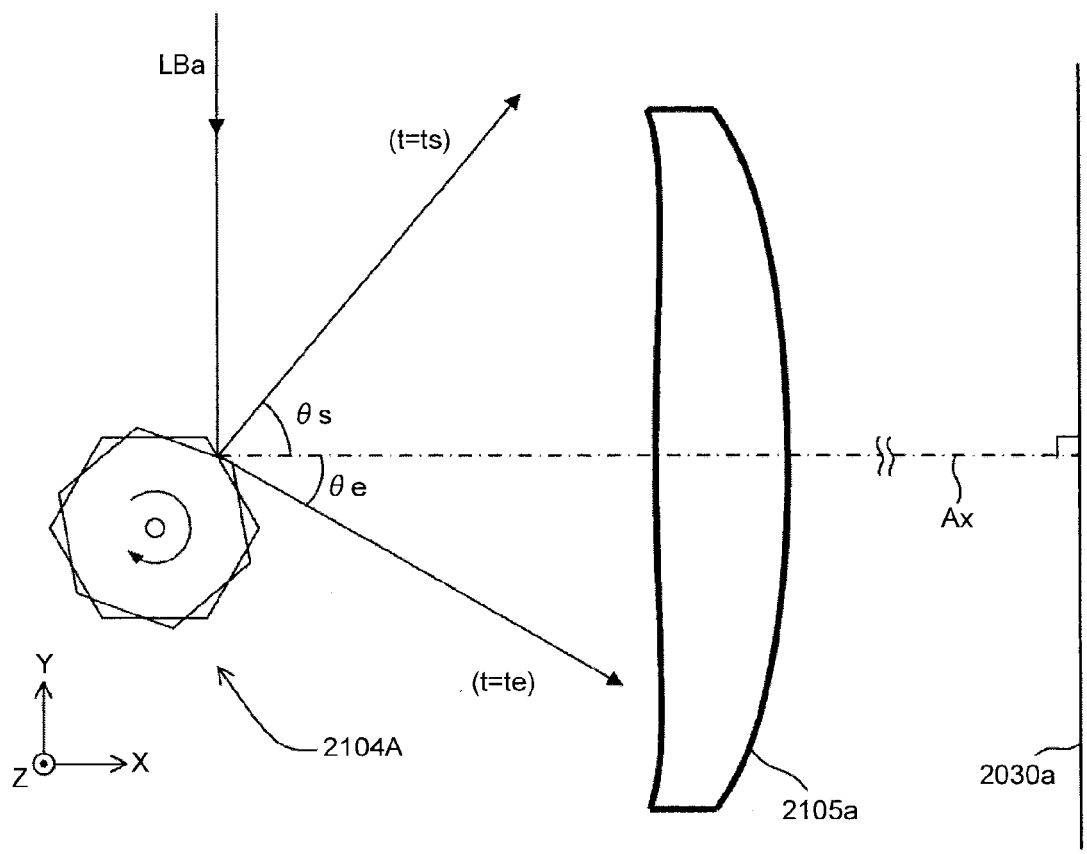
FIG. 13 is a schematic diagram for explaining $\theta s$ and $\theta e$.

FIG. 13 simultaneously illustrates both the timing when t=ts and the timing when t=te in the present embodiment. In FIG. 13, for sake of simplicity, the return of the light path by the reflecting mirrors is omitted. And, only the surface of the photosensitive drum 2030a is shown as a target surface at the "+X" side of the scanning lens 2105a. An axis orthogonal to the target surface is assumed as a reference axis Ax. An angle formed between the reflected light and the reference axis Ax when t=ts is called θs, and an angle formed between the reflected light and the reference axis Ax when t=te is called θe.

In the present embodiment, the reference axis coincides with a normal line at original points of Aspherical Surface Formulae representing both an incident side surface shape and an emission side surface shape of the scanning lens 2105a, respectively.

Figure 14:
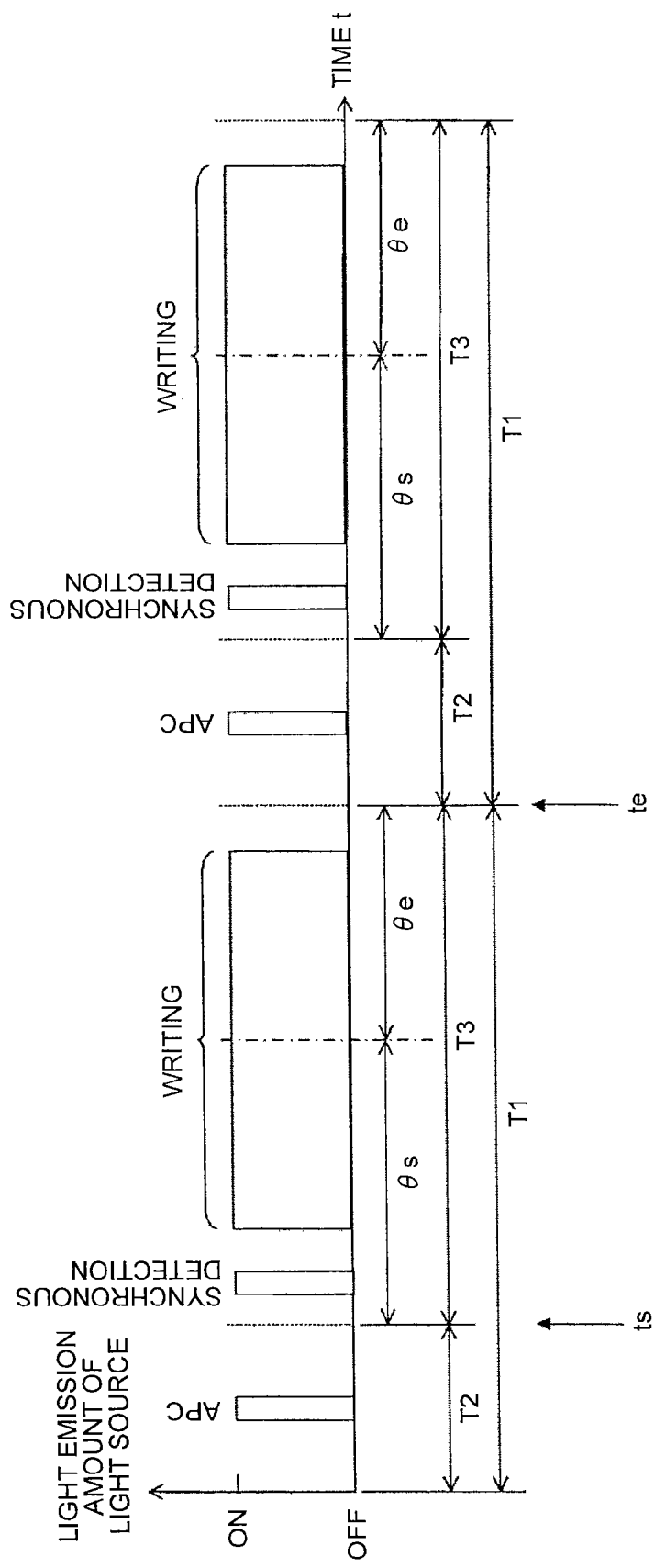
FIG. 14 is another schematic diagram for explaining $\theta s$ and $\theta e$.

In a case that the light beam is reflected at the edge of the deflecting reflection surface s1 adjacent to the deflecting reflection surface s2 at timing when t=te as in the present embodiment, θs is larger than θe (θs>θe) (see FIG. 14).

In a case that the effective scanning area is set as substantially symmetry against the reference axis Ax, an imaging property on the target surface can be improved, and more flexible layout can be feasible.

By the way, in the optical scanning apparatus disclosed in the Japanese Patent No. 4428920, there is less time for the light source to emit the light beam within one scanning time period. Thereby, there is a need to shorten a time period for the APC, a time period for the synchronous detection which is necessary for determining start timing for emitting the light within the effective scanning area, and a time period for scanning the effective scanning area. Particularly, the shorten time period for scanning the effective scanning area, i.e. a narrower range of deflecting angle (field angle) of the polygon mirror for scanning the effective scanning area requires disadvantageously a longer light path in order to maintain a required scanning width which is determined based on paper size. Thereby, it may increase a required unit size, or may limit the flexible layout.

As described above, the optical scanning apparatus 2010 according to the present embodiment is provided with the four light sources (2200a, 2200b, 2200c and 2200d), the four pre-deflector optical systems, the four synchronous detection optical systems, the two polygon mirrors (2104A and 2104B), the four scanning optical systems, the scanning control unit, and so on.

The polygon mirror 2104A is set so that between the angles formed by the light beam LBa entering the deflecting reflection surface and the corresponding deflecting reflection surface, the angle on the side including reflected light of the light beam LBa is always an obtuse angle. In this case, the light beam LBa does not enter the deflecting reflection surface with an incident angle of 0°, and the reflected light of the light beam LBa can be prevented from returning to the light source 2200a.

The polygon mirror 2104A is set so that between the angles formed by the light beam LBb entering the deflecting reflection surface and the deflecting reflection surface, the angle on the side including reflected light of the light beam LBb is always an obtuse angle. In this case, the light beam LBb does not enter the deflecting reflection surface with an incident angle of 0°, and the reflected light of the light beam LBb can be prevented from returning to the light source 2200b.

Similarly, the polygon mirror 2104B is set so that between the angles formed by the light beam LBc entering the deflecting reflection surface and the deflecting reflection surface, the angle on the side including reflected light of the light beam LBc is always an obtuse angle. In this case, the light beam LBc does not enter the deflecting reflection surface with an incident angle of 0°, and the reflected light of the light beam LBc can be prevented from returning to the light source 2200c.

The polygon mirror 2104B is set so that between the angles formed by the light beam LBd entering the deflecting reflection surface and the deflecting reflection surface, the angle on the side including reflected light of the light beam LBd is always an obtuse angle. In this case, the light beam LBd does not enter the deflecting reflection surface with an incident angle of 0°, and the reflected light of the light beam LBd can be prevented from returning to the light source 2200d.

Thus, the scanning control unit can perform the APC for each light source with high accuracy. Since the field angle can be increased, the size reduction can be realized. A wave plate or the like for cutting off the return light is not required. Thereby, there is less limitation to the layout, less number of components, and less cost in accordance with the less number of components.

Namely, the optical scanning apparatus 2010 can eliminate the light returning to the light source without leading to increase in size or cost.

Since the color printer 2000 is provided with the optical scanning apparatus 2010, the cost reduction can be realized without lowering image quality.

Figure 15:
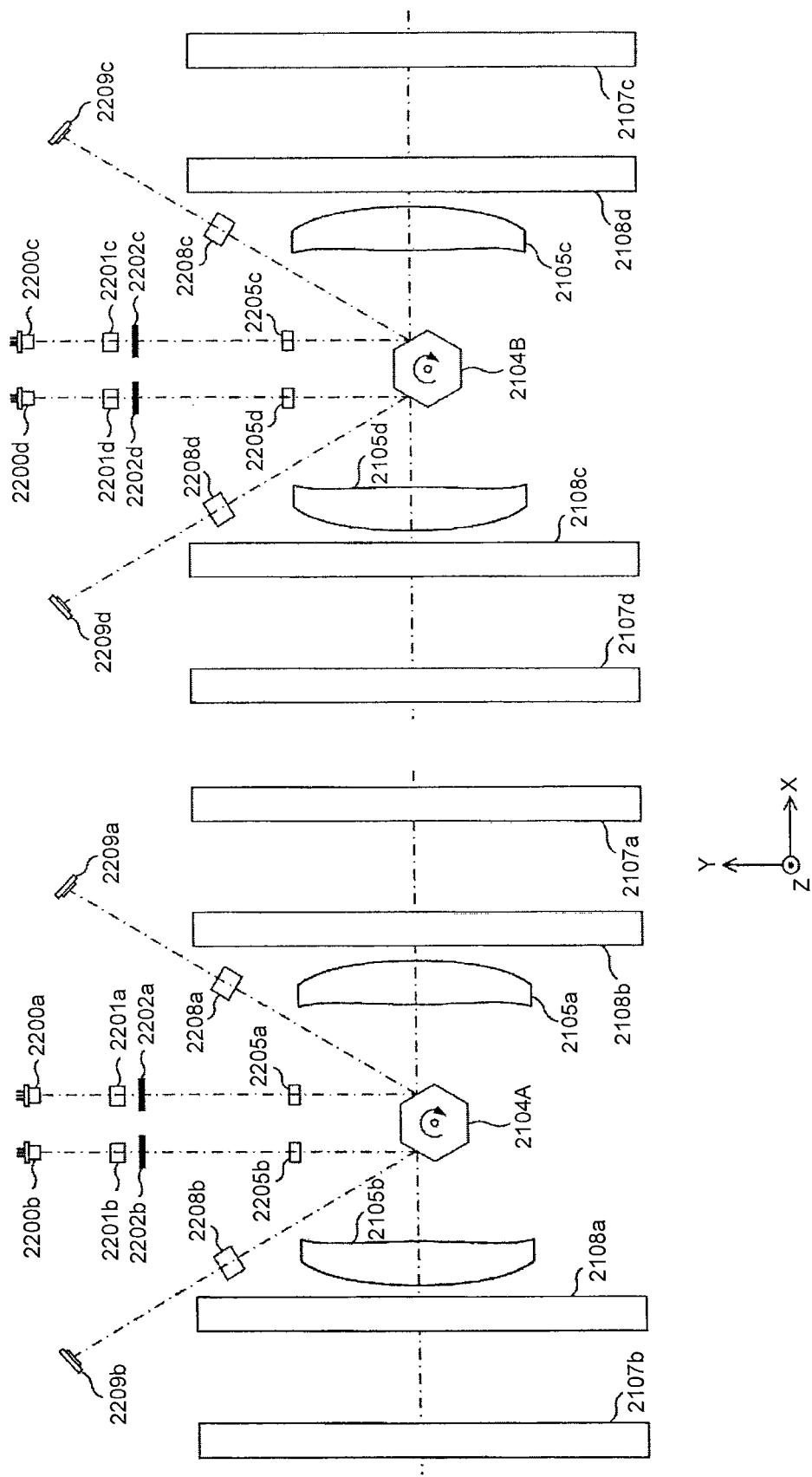
FIG. 15 is a schematic diagram for explaining a modified example of an arrangement of a synchronous detection optical system.

In a case that the synchronous detection sensor is disposed on the light source side, it is possible to maintain a longer time period for scanning the effective scanning area, while keeping a good imaging property and a high degree of freedom in layout. This may apply to another station disposed oppositely across the polygon mirror. Thereby, all the synchronous detection optical systems may be disposed at the light source side as illustrated in FIG. 15 in the aforementioned embodiment.

In this case, in the C station and the Y station, the synchronous detection for the next scanning is performed after the writing is finished.

In order to improve the flexibility in layout design or reduce the number of components, the synchronous detection optical system corresponding to either the light source 2200a or 2200b may be omitted in the aforementioned embodiment. For example, in a case that the synchronous detection optical system corresponding to the light source 2200a is omitted, it is possible to determine, as the timing to start the writing onto the photosensitive drum 2030a, a timing when a predetermined time period (a delay time) elapses from a timing to start the writing onto the photosensitive drum 2030b which is determined on the basis of the output signal from the synchronous detection sensor 2209b. In this case, it is possible to reduce the vertical line fluctuation due to the surface accuracy error or variation among the deflecting reflection surfaces of the polygon mirror, if the delay time is set or arranged so that the light beam LBa enters the same deflecting reflection surface which the light beam LBb enters, for example.

Similarly, the synchronous detection optical system corresponding to either the light source 2200c or 2200d may be omitted.

Figure 16A:
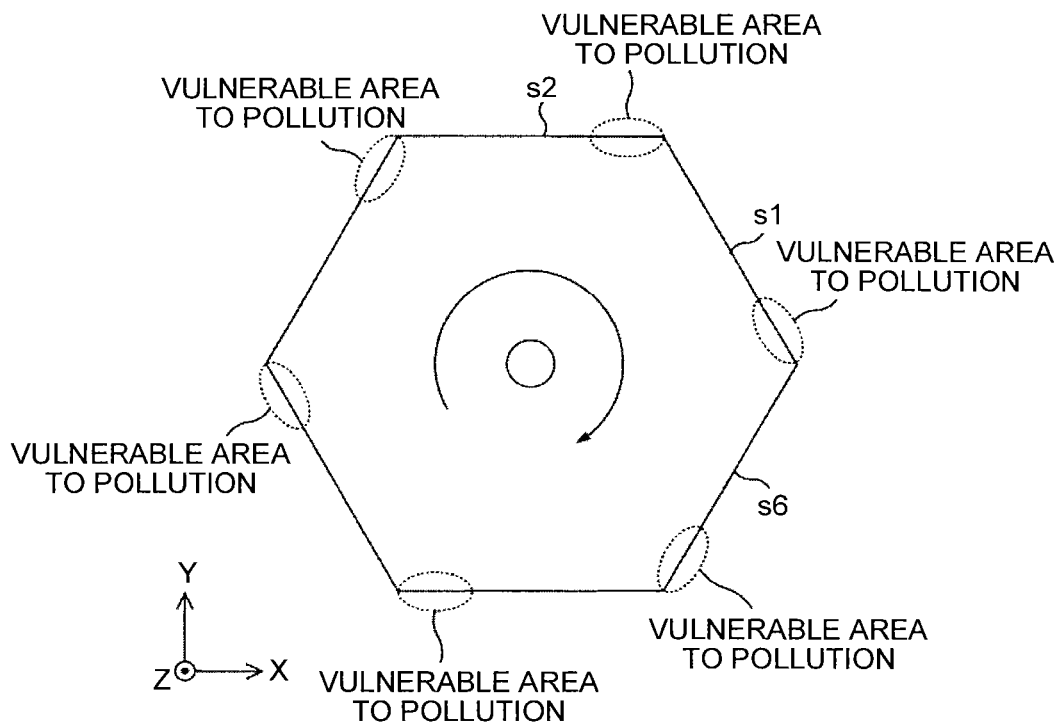
FIG. 16A is a schematic diagram for explaining areas vulnerable to pollution on deflecting reflection surfaces.
Figure 16B:
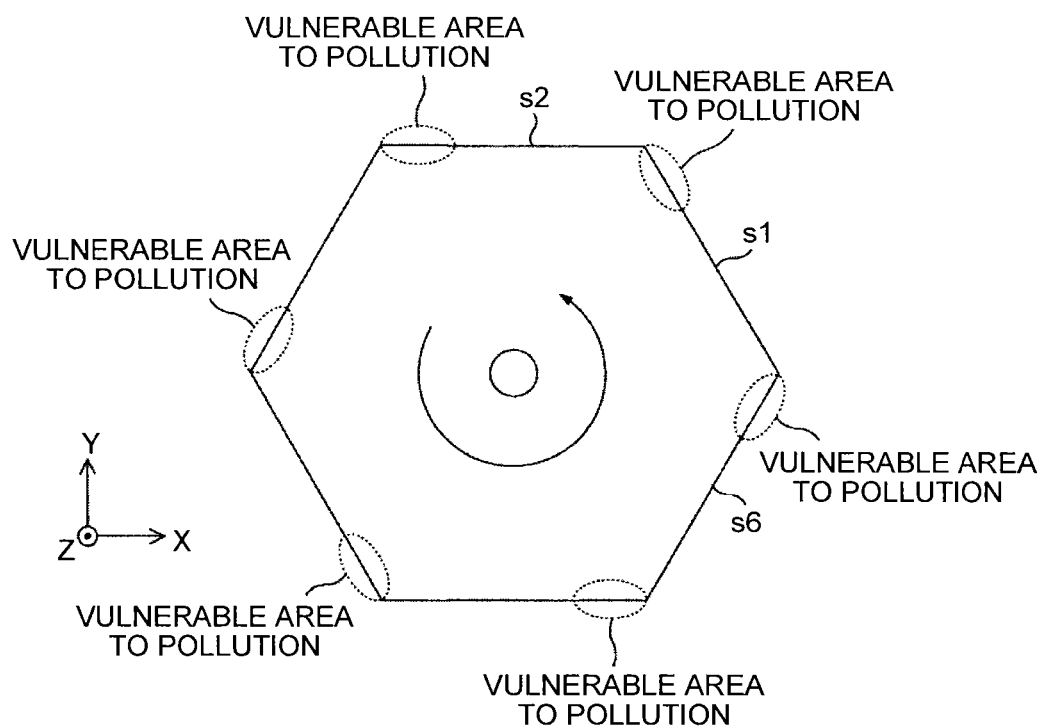
FIG. 16B is another schematic diagram for explaining areas vulnerable to pollution on deflecting reflection surfaces.

By the way, in general, the polygon mirror fans the air at each corner where two adjacent deflecting reflection surfaces adjacent to each other meet together. Thereby, a portion downstream of the corner is vulnerable to pollution. As illustrated in FIG. 16A, in a case that the polygon mirror rotates in a clockwise direction, as for the deflecting reflection surface s1, the edge near the deflecting reflection surface s6 is vulnerable to pollution. On the other hand, as illustrated in FIG. 16B, in a case that the polygon mirror rotates in an anti-clockwise direction, as for the deflecting reflection surface s1, the edge near the deflecting reflection surface s2 is vulnerable to pollution.

If the light beam reflected at the polluted portion on the deflecting reflection surface enters the synchronous detection sensor, an error may be caused in the start timing for the writing, or the vertical line fluctuation may be caused by a less amount of light entering the synchronous detection sensor.

Figure 17:
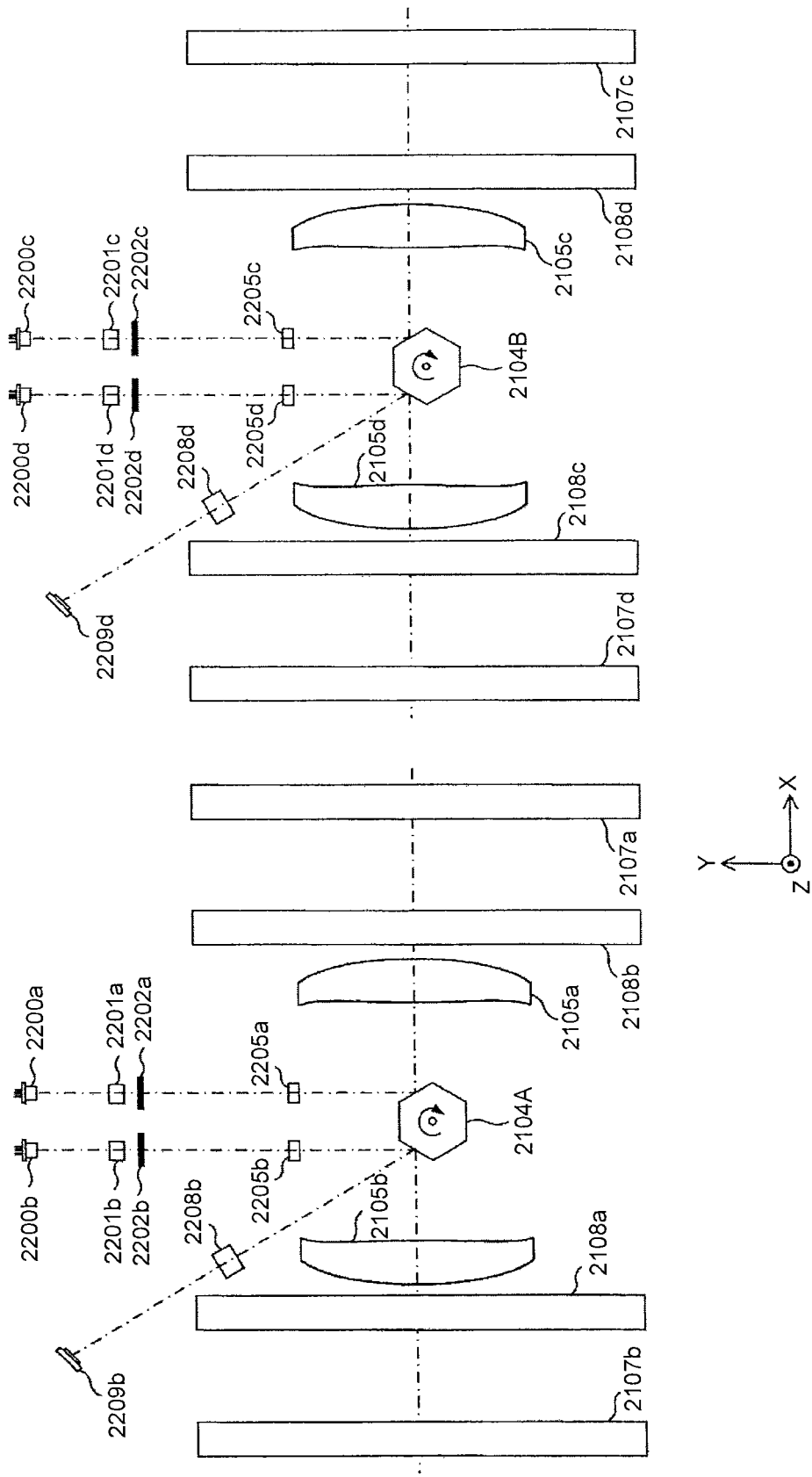
FIG. 17 is a schematic diagram for explaining a modified example of an arrangement of a synchronous detection optical system, taking account of the pollution on the deflecting reflection surfaces.
Figure 18:
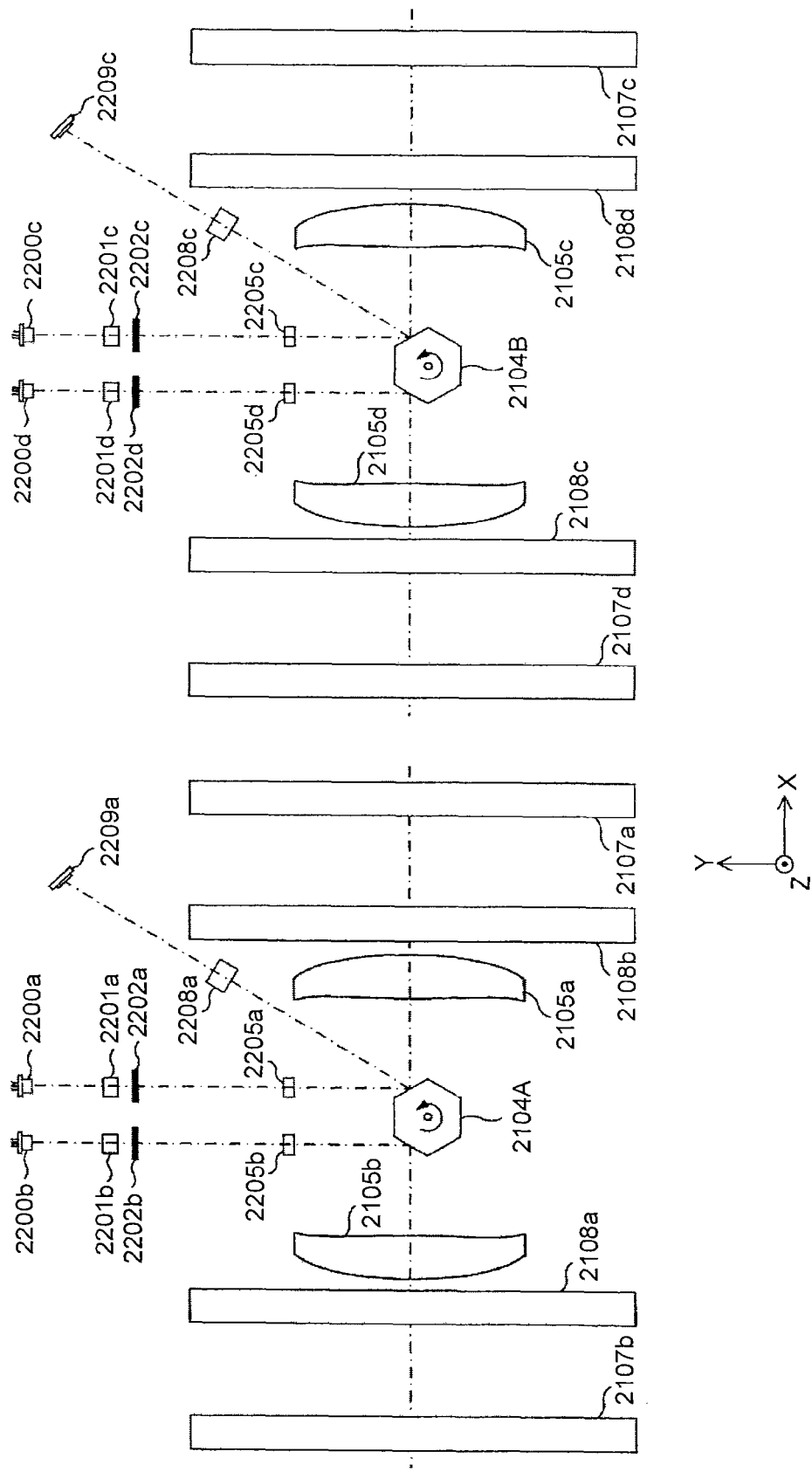
FIG. 18 is another schematic diagram for explaining a modified example of an arrangement of a synchronous detection optical system, taking account of the pollution on the deflecting reflection surfaces.

In a case that the pollution on the deflecting reflection surface must be concerned, as illustrated in FIG. 17 and FIG. 18 for example, it is preferable to arrange the light beam to enter the synchronous detection sensor so as to be reflected at a portion on the surface invulnerable to pollution.

Figure 19:
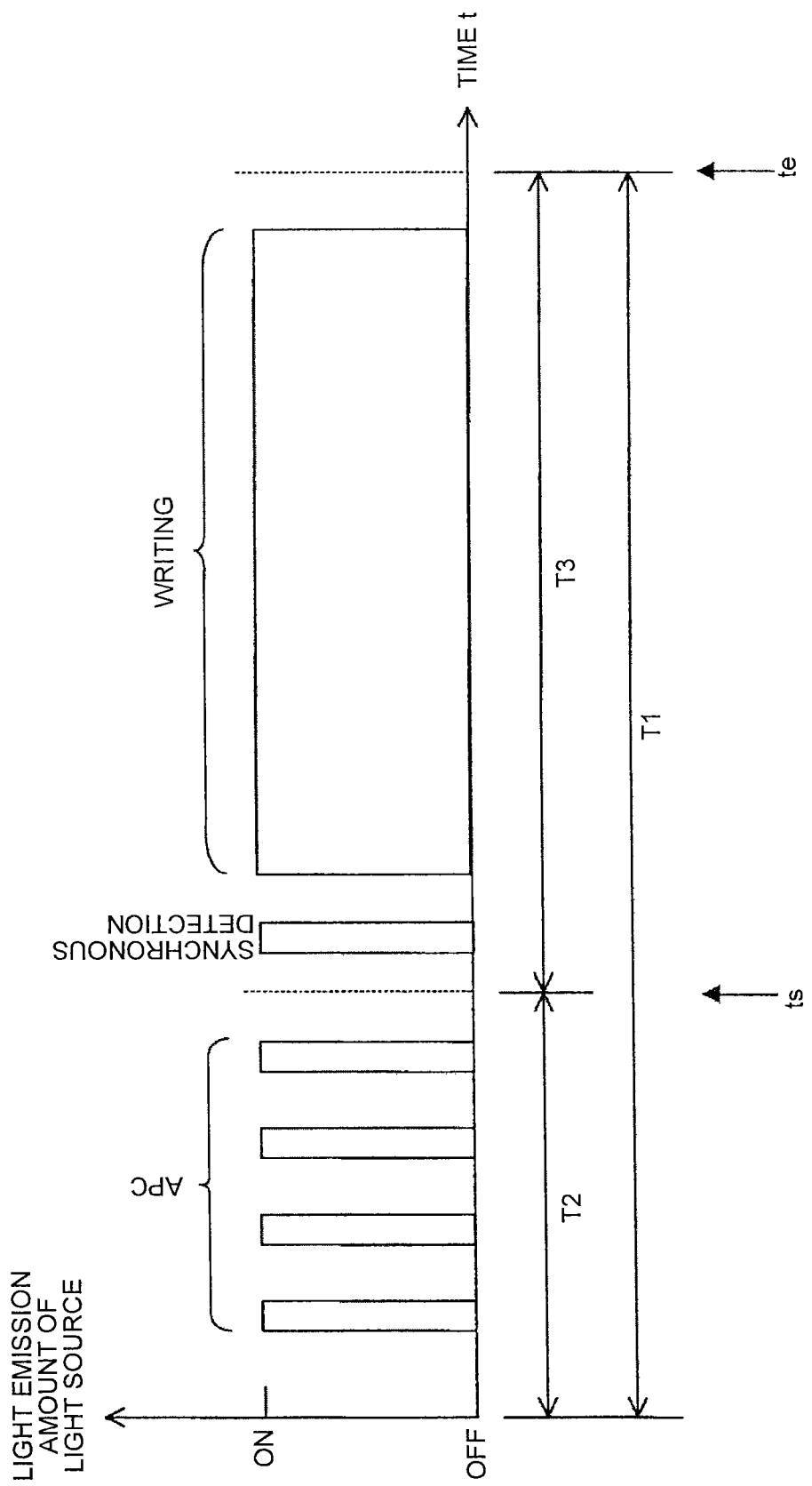
FIG. 19 is a timing chart for explaining an APC performed when a light source has four light emitting elements.

In the aforementioned embodiment, the explanation has been made on the example where the light source has one light emitting unit. However, the embodiment is not limited to this. The light source may have a plurality of light emitting units. As an example, FIG. 19 illustrates timings for APCs in a case that the light source has four light emitting units.

Figure 20:
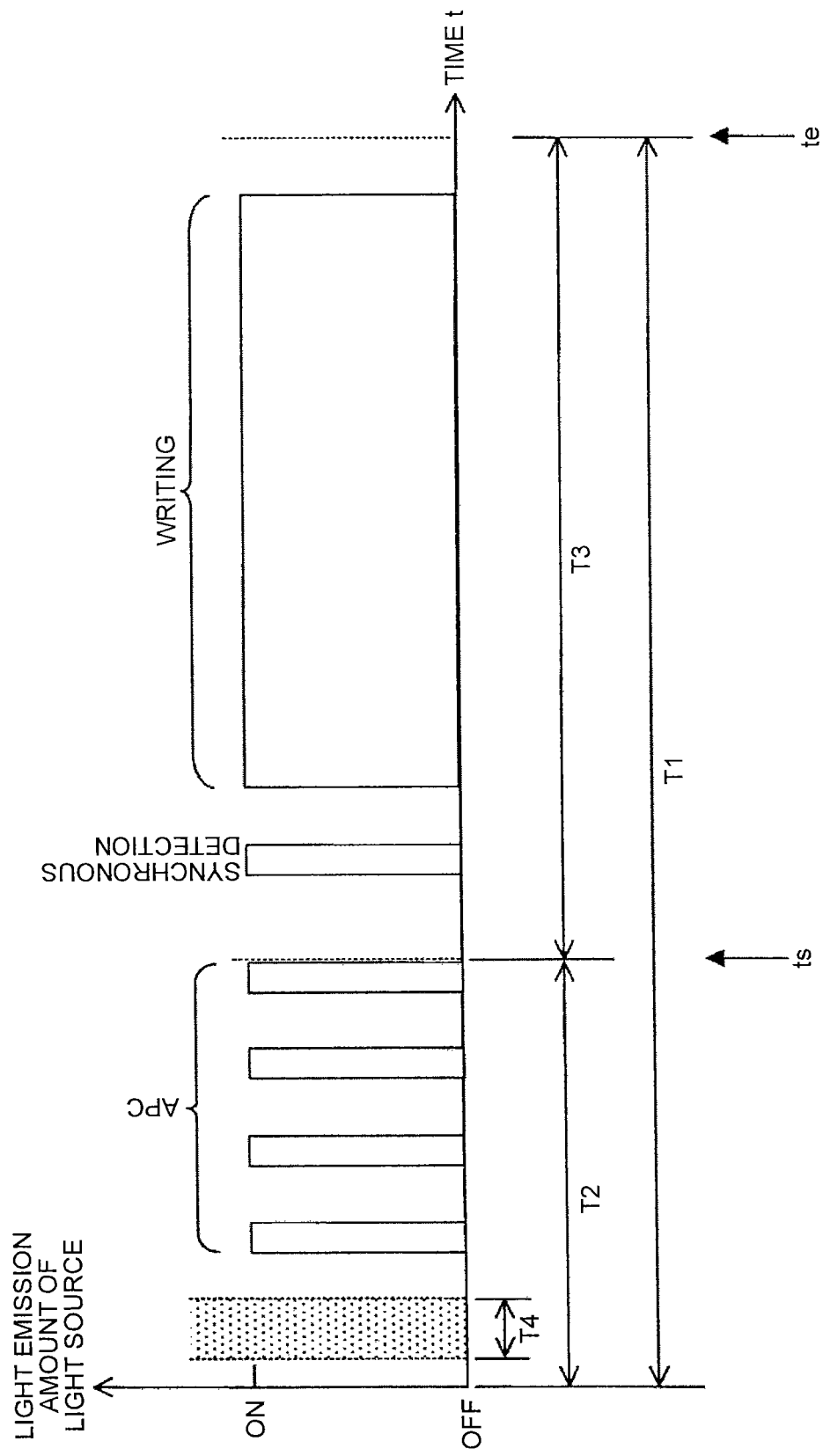
FIG. 20 is a timing chart for explaining a comparative example.

Relating to this case, FIG. 20 illustrates timings for APCs in a configuration where the reflected light returns to the light source, as a comparative example. In this comparative example, the APCs have to be performed at timings other than T4. Consequently, there is less time for the writing.

Figure 21:
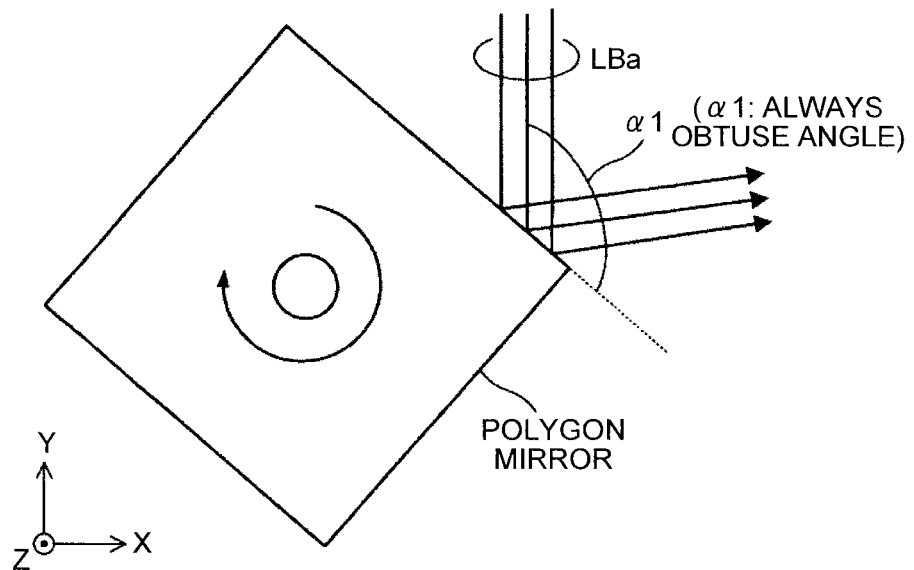
FIG. 21 is a schematic diagram for explaining a case where a polygon mirror is a four-faceted rotating mirror.
Figure 22:
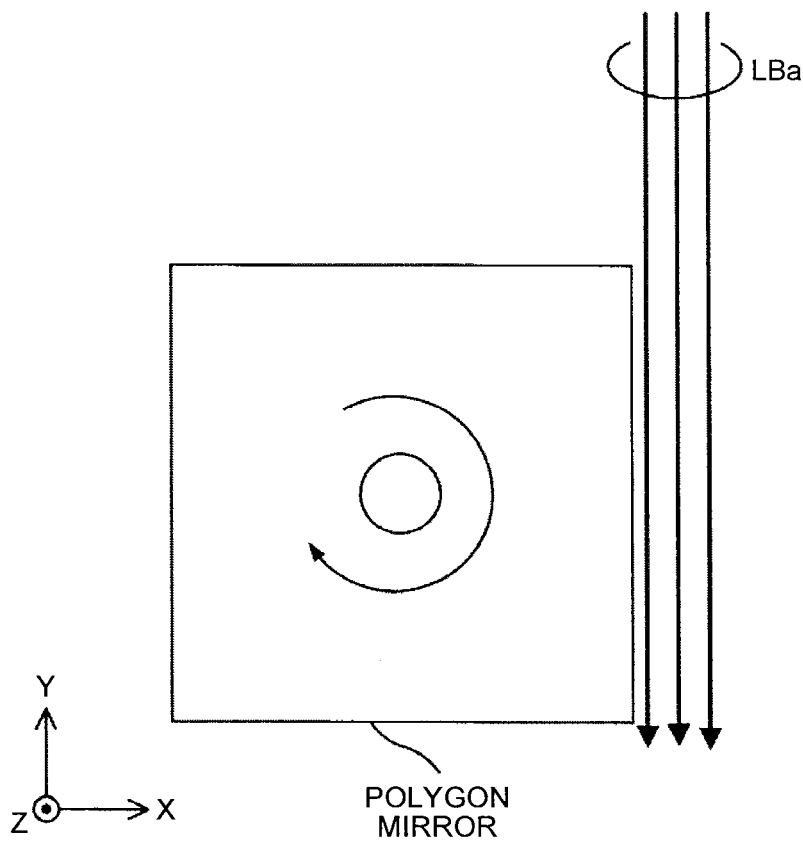
FIG. 22 is another schematic diagram for explaining a case where a polygon mirror is a four-faceted rotating mirror.

In the aforementioned embodiment, the explanation has been made on the example where the polygon mirror is comprised of the six-faceted rotating mirror. However, the embodiment is not limited to this. For example, as illustrated in FIG. 21, the polygon mirror may be comprised of a four-faceted rotating mirror. Also in this case, it is preferable to set the apparatus so that the angle α1, which is formed between a deflecting reflection surface and a light beam toward the deflecting reflection surface, and which includes a reflected light from the deflecting reflection surface, is always obtuse. Incidentally, it is set so that no light beam enters any reflection surface with the incident angle being zero, as illustrated in FIG. 22.

Figure 23:
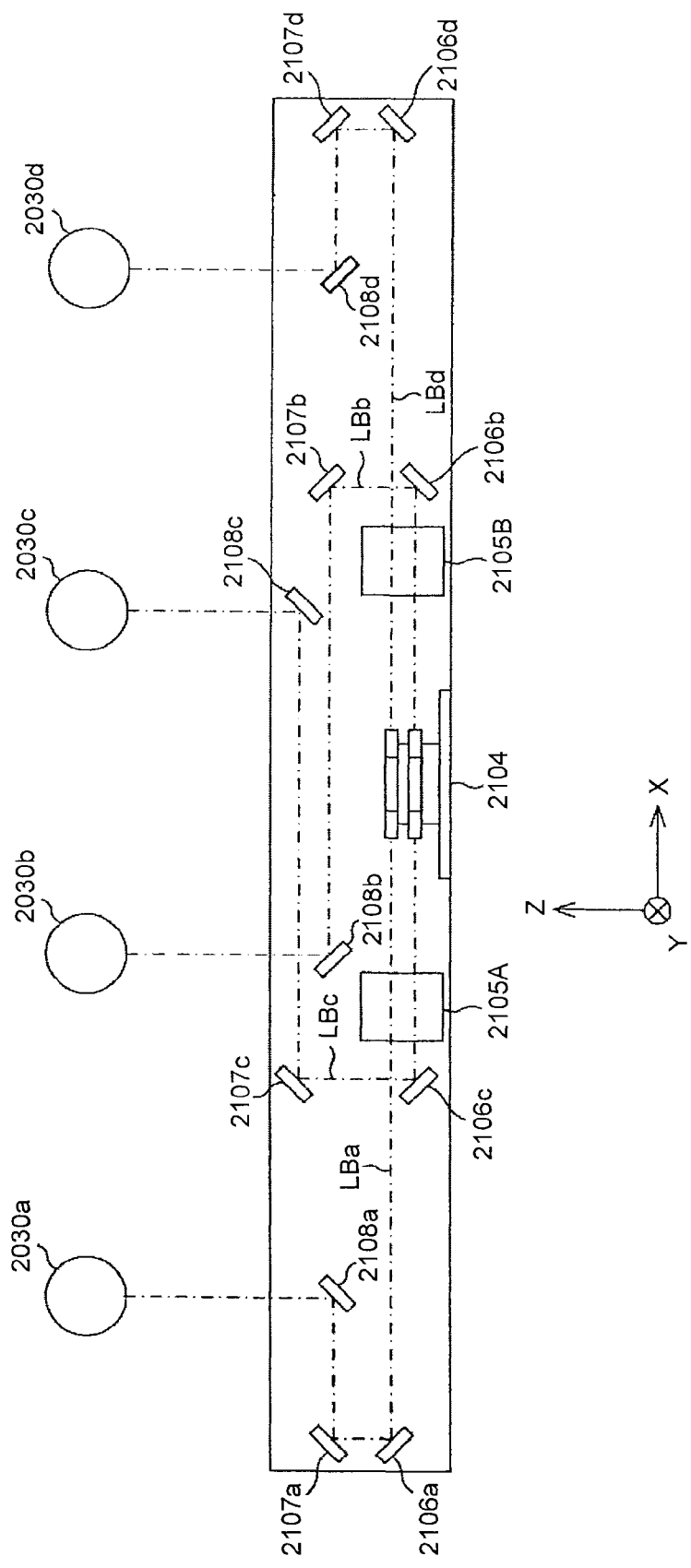
FIG. 23 is a schematic diagram for explaining a modified example of the scanning optical system.
Figure 24:
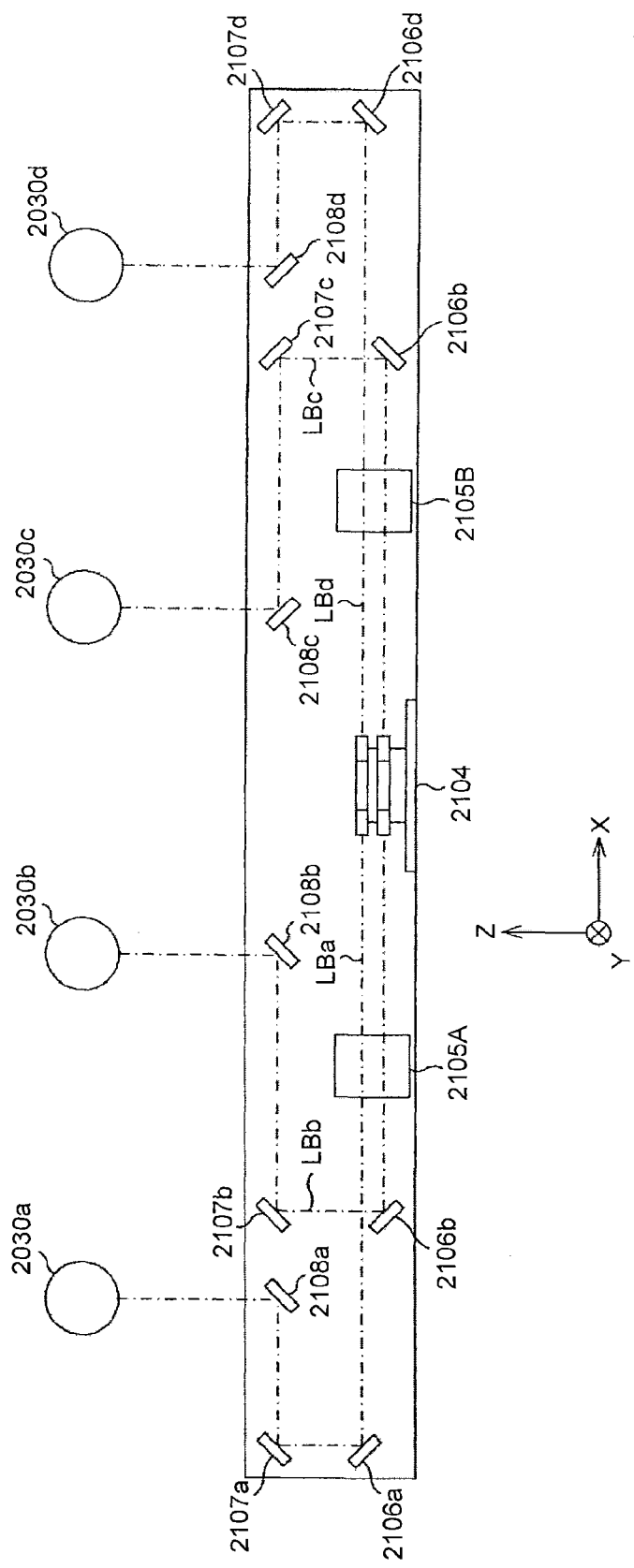
FIG. 24 is a schematic diagram for explaining another modified example of the scanning optical system.

In the aforementioned embodiment, the explanation has been made on the example where two polygon mirrors are used. However, the embodiment is not limited to this. It is possible to use only one polygon mirror 2104 which is a two-stage type mirror as illustrated in FIG. 23 and FIG. 24, for example. In this example, a gap between the upper stage and the lower stage is set as 10 mm, as one example.

In FIG. 23, the light beam LBa is deflected at a deflecting reflection surface of the upper stage toward the "−X" side of the polygon mirror 2104. The deflected light beam LBa is directed to the photosensitive drum 2030a via the scanning lens 2105A and three reflecting mirrors 2106a, 2107a and 2108a.

The light beam LBb is deflected at a deflecting reflection surface of the lower stage toward the "+X" side of the polygon mirror 2104. The deflected light beam LBb is directed to the photosensitive drum 2030b via the scanning lens 2105B and three reflecting mirrors 2106b, 2107b and 2108b.

The light beam LBc is deflected at a deflecting reflection surface of the lower stage toward the "−X" side of the polygon mirror 2104. The deflected light beam LBc is directed to the photosensitive drum 2030c via the scanning lens 2105A and three reflecting mirrors 2106c, 2107c and 2108c.

The light beam LBd is deflected at a deflecting reflection surface of the upper stage toward the "+X" side of the polygon mirror 2104. The deflected light beam LBd is directed to the photosensitive drum 2030d via the scanning lens 2105B and three reflecting mirrors 2106d, 2107d and 2108d.

In FIG. 24, the light beam LBa is deflected at a deflecting reflection surface of the upper stage toward the "-X" side of the polygon mirror 2104. The deflected light beam LBa is directed to the photosensitive drum 2030a via the scanning lens 2105A and three reflecting mirrors 2106a, 2107a and 2108a.

The light beam LBb is deflected at a deflecting reflection surface of the lower stage toward the "-X" side of the polygon mirror 2104. The deflected light beam LBb is directed to the photosensitive drum 2030b via the scanning lens 2105A and three reflecting mirrors 2106b, 2107b and 2108b.

The light beam LBc is deflected at a deflecting reflection surface of the lower stage toward the "+X" side of the polygon mirror 2104. The deflected light beam LBc is directed to the photosensitive drum 2030c via the scanning lens 2105B and three reflecting mirrors 2106c, 2107c and 2108c.

The light beam LBd is deflected at a deflecting reflection surface of the upper stage toward the "+X" side of the polygon mirror 2104. The deflected light beam LBd is directed to the photosensitive drum 2030d via the scanning lens 2105B and three reflecting mirrors 2106d, 2107d and 2108d.

Figure 25:
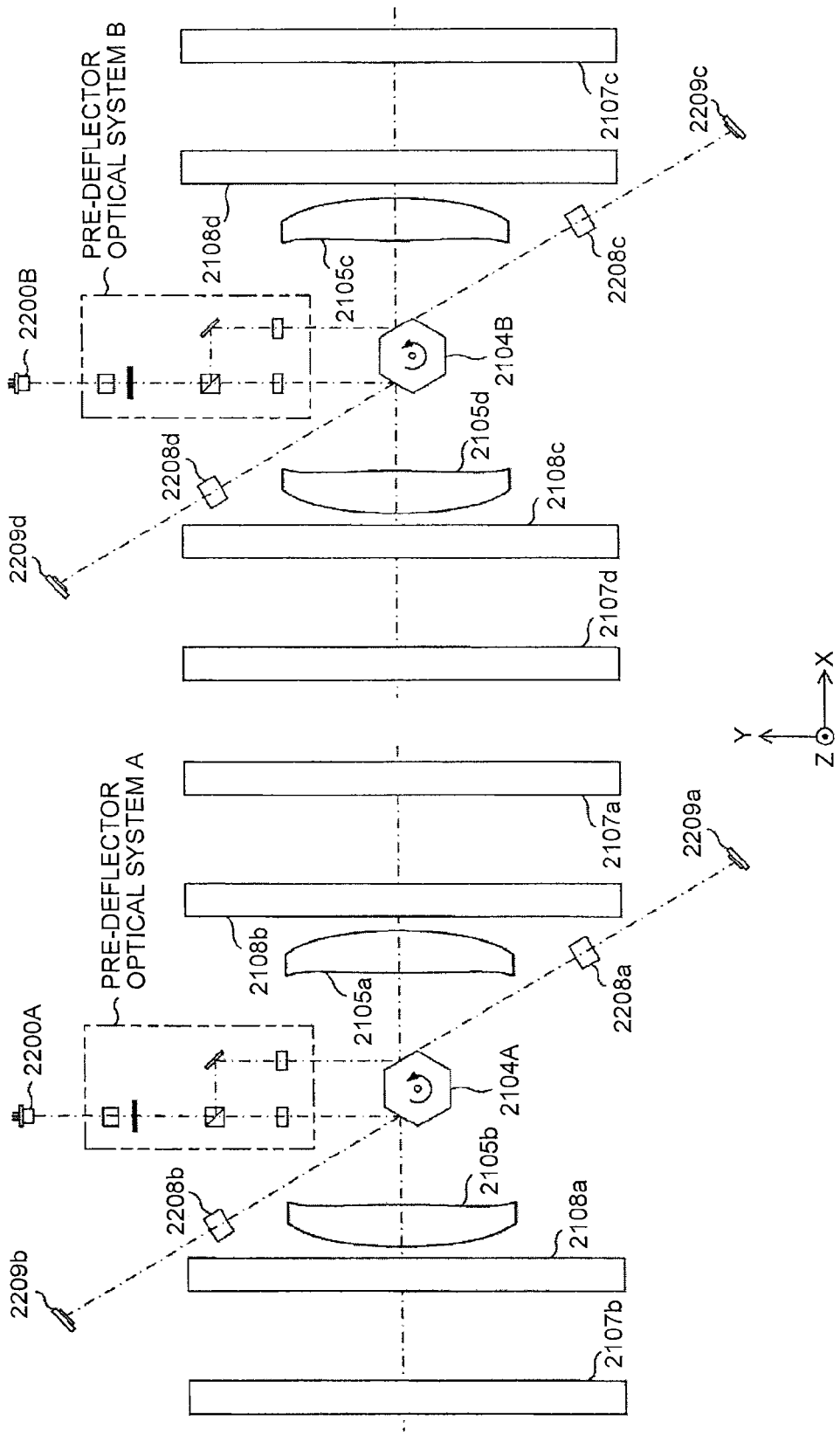
FIG. 25 is a schematic diagram for explaining a modified example of the optical scanning apparatus.

FIG. 25 illustrates a modified example of the optical scanning apparatus 2010, that is, the optical scanning apparatus 2010A.

The optical scanning apparatus 2010A is provided with two light sources 2200A and 2200B, instead of the four light sources 2200a, 2200b, 2200c and 2200d. Furthermore, the apparatus 2010A is provided with two pre-deflector optical systems A and B, instead of the four pre-deflector optical systems. The explanation below will be focused on the difference from the aforementioned embodiment. Therefore, the same or corresponding components as or to those of the optical scanning apparatus 2010 have the identical reference numerals and the explanation thereof is omitted or simplified.

Both the light source 2200A and the light source 2200B are the same as that of the aforementioned embodiment. The light source 2200A and the light source 2200B are disposed apart from each other in the X axis direction, and both sources emit the light beam toward the "-Y" direction.

Figure 26:
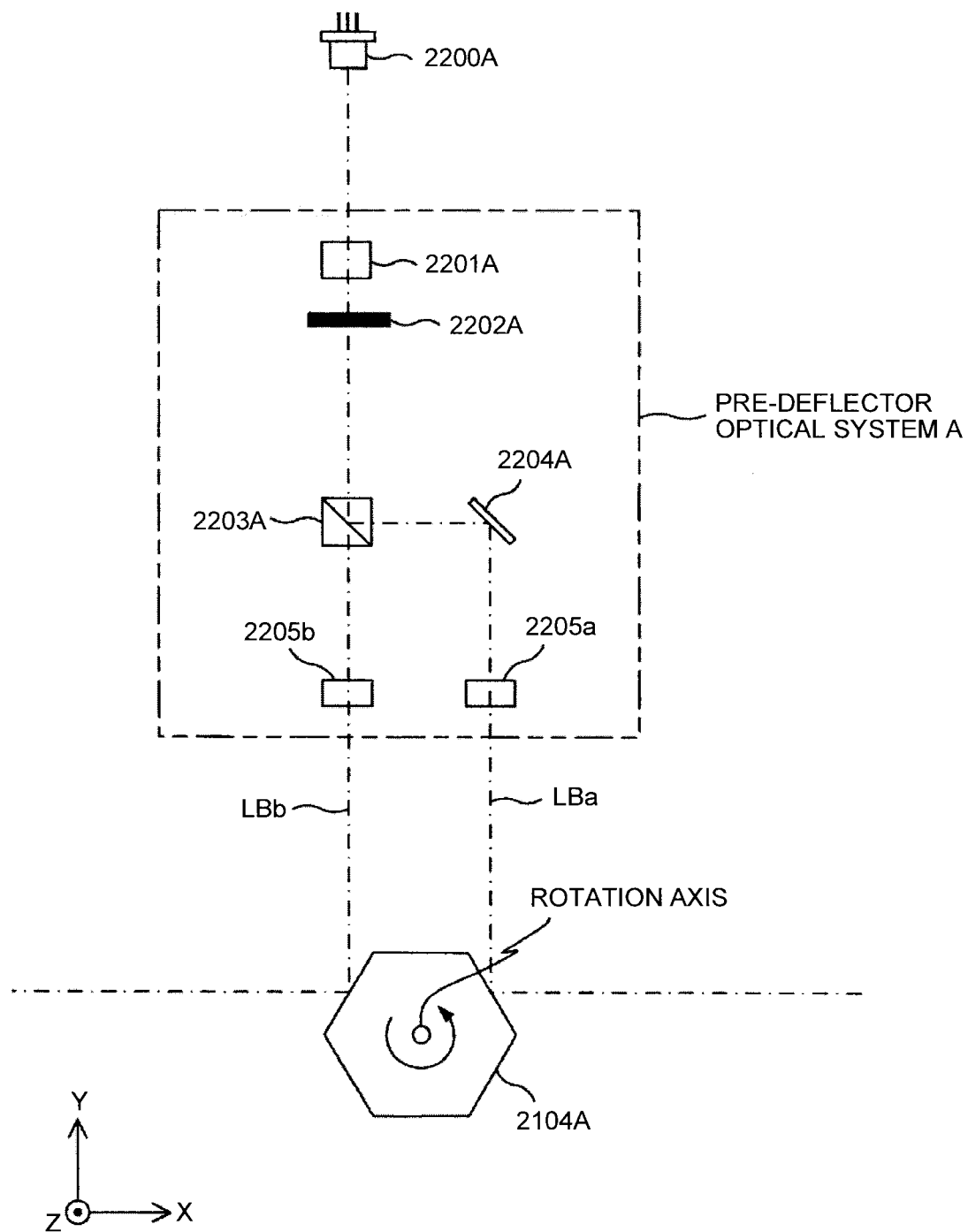
FIG. 26 is a schematic diagram for explaining a pre-deflector optical system A illustrated in FIG. 25.

The pre-deflector optical system A is an optical system disposed between the light source 2200A and the polygon mirror 2104A. As one example as illustrated in FIG. 26, there is provided with a coupling lens 2201A, an aperture plate 2202A, a beam splitter 2203A, a reflecting mirror 2204A, and two cylindrical lenses 2205a and 2205b.

The coupling lens 2201A is disposed on the light path of the light beam emitted from the light source 2200A, for producing a parallel light beam.

The aperture plate 2202A has an aperture for reshaping the light beam from the coupling lens 2201A.

The beam splitter 2203A allows a half of the light beam passed through the aperture of the aperture plate 2202A to pass through the splitter, and reflects the remaining half of the light beam toward the "+X" direction. The light beam reflected by the beam splitter 2203A is the light beam LBa. The light beam passed through the beam splitter 2203A is the light beam LBb.

The reflecting mirror 2204A is disposed on the light path of the light beam LBa reflected by the beam splitter 2203A, for deflecting the light path of the light beam toward the "-Y" direction.

The cylindrical lens 2205a is disposed on the light path of the light beam LBa from the reflecting mirror 2204A, for providing an image with the light beam in the vicinity of a deflecting reflection surface of the polygon mirror 2104A with respect to the Z axis direction.

The cylindrical lens 2205b is disposed on the light path of the light beam LBb passed through the beam splitter 2203A, for providing an image with the light beam in the vicinity of a deflecting reflection surface of the polygon mirror 2104A with respect to the Z axis direction.

Figure 27:
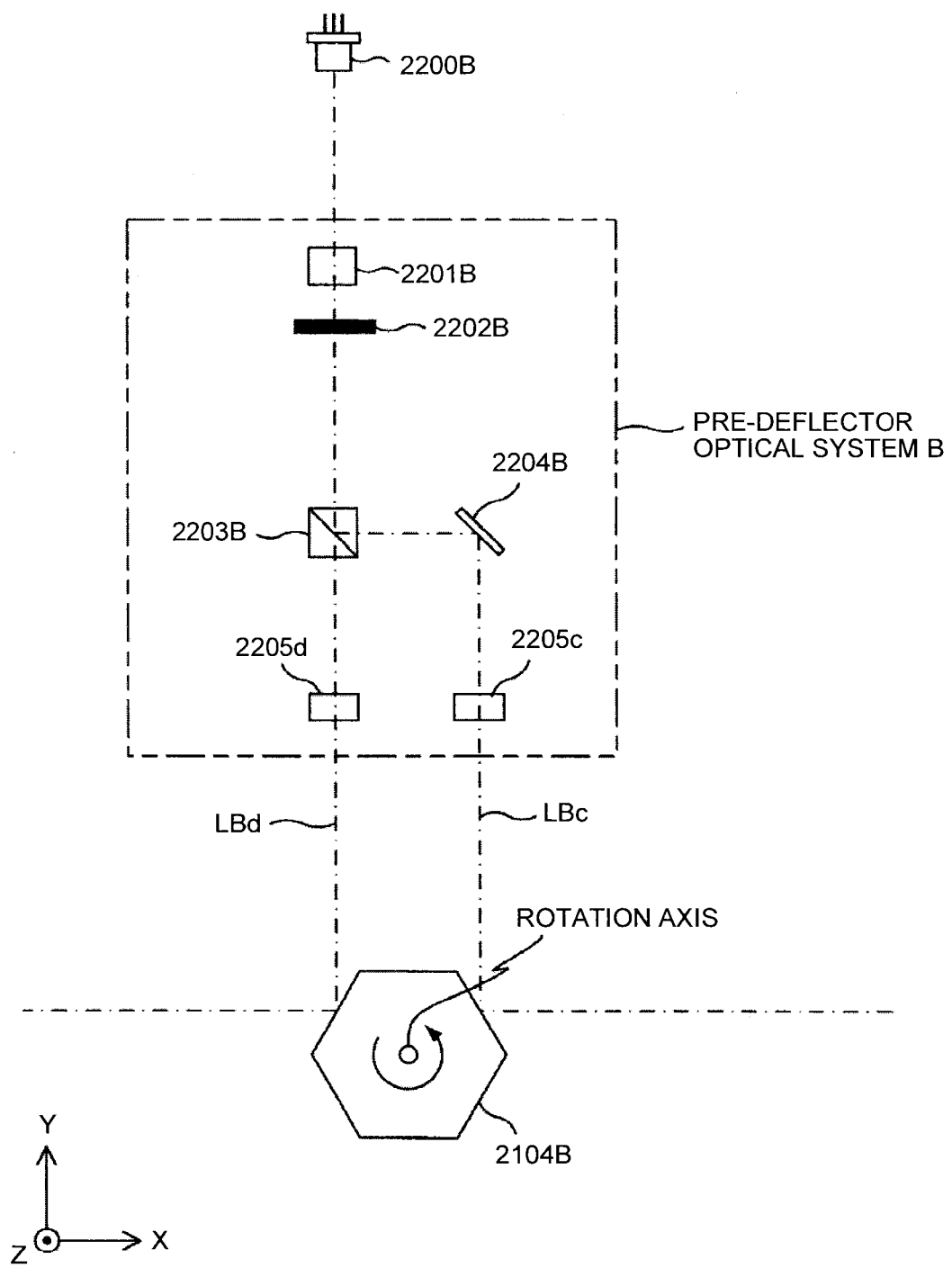
FIG. 27 is a schematic diagram for explaining a pre-deflector optical system B illustrated in FIG. 25.

The pre-deflector optical system B is an optical system disposed between the light source 2200B and the polygon mirror 2104B. As one example as illustrated in FIG. 27, there is provided with a coupling lens 2201B, an aperture plate 2202B, a beam splitter 2203B, a reflecting mirror 2204B, and two cylindrical lenses 2205c and 2205d.

The coupling lens 2201B is disposed on the light path of the light beam emitted from the light source 2200B, for producing a parallel light beam.

The aperture plate 2202B has an aperture for reshaping the light beam from the coupling lens 2201B.

The beam splitter 2203B allows a half of the light beam passed through the aperture of the aperture plate 2202B to pass through the splitter, and reflects the remaining half of the light beam toward the "+X" direction. The light beam reflected by the beam splitter 2203B is the light beam LBc. The light beam passed through the beam splitter 2203B is the light beam LBd.

The reflecting mirror 2204B is disposed on the light path of the light beam LBc reflected by the beam splitter 2203B, for deflecting the light path of the light beam toward the "-Y" direction.

The cylindrical lens 2205c is disposed on the light path of the light beam LBc from the reflecting mirror 2204B, for providing an image with the light beam in the vicinity of a deflecting reflection surface of the polygon mirror 2104B with respect to the Z axis direction.

The cylindrical lens 2205d is disposed on the light path of the light beam LBd passed through the beam splitter 2203B, for providing an image with the light beam in the vicinity of a deflecting reflection surface of the polygon mirror 2104B with respect to the Z axis direction.

Figure 28:
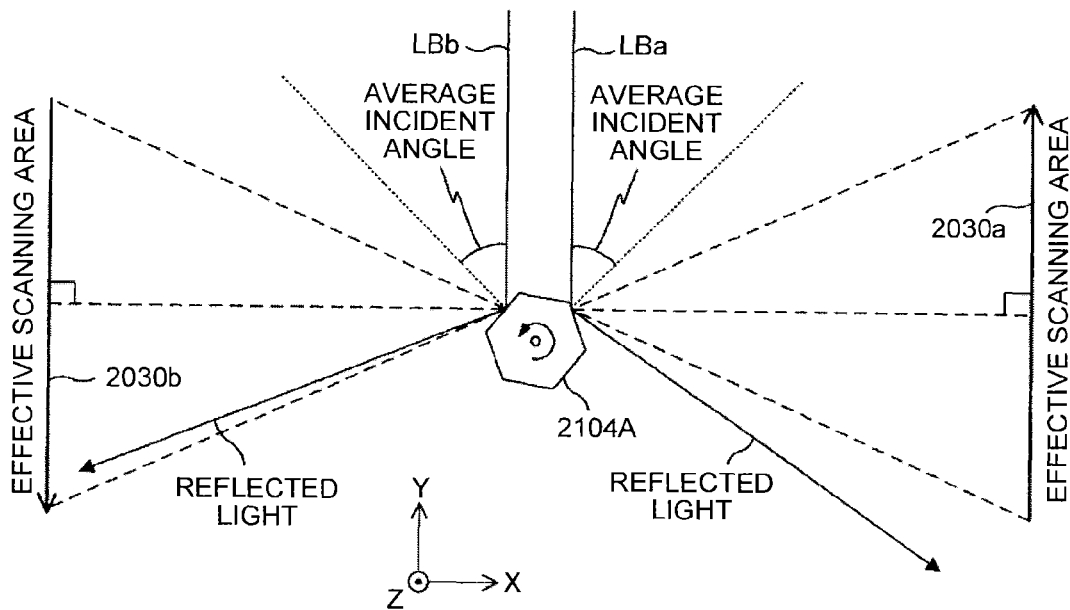
FIG. 28 is a schematic diagram for explaining an average incident angle.

A position of the reflecting mirror 2204A is adjusted with respect to the X axis direction so that the light beam LBa enters a deflecting reflection surface different from a deflecting reflection surface which the light beam LBb enters (see FIG. 28). Relating to this, if the average incident angle of the light beams LBa and LBb is directed to be about 45 degrees, the reflecting mirror 2204A can be positioned so that the light beams LBa and LBb direct toward the polygon mirror 2104A while keeping a parallel relationship with each other. And, an assembly and adjustment of optical elements after the beam splitter 2203A on the path can be facilitated or simplified. Incidentally, for sake of simplicity, FIG. 28 shows that each light beam deflected by the polygon mirror 2104A directs toward the respective effective scanning areas without being deflected by the reflecting mirrors.

The average incident angle is an average incident angle of light beams which scan the effective scanning area. In a case of FIG. 28, the light beam which entered the deflecting reflection surface with the incident angle same as the average incident angle enters the scanning target surface parallel to a surface orthogonal to the rotation axis direction of the photosensitive drum. Incidentally, if the optical axis of the scanning lens deviates toward the "−Y" side (an opposite side of the light source) with respect to the main scanning direction (the Y axis direction in FIG. 28), the light beam which entered the deflecting reflection surface with the incident angle same as the average incident angle does not always enter the scanning target surface parallel to the surface orthogonal to the rotation axis direction of the photosensitive drum.

Furthermore, it is possible to reduce the number of reflecting mirrors by separating the light beam LBa and the light beam LBb in the X axis direction by a spatial gap between the beam splitter 2203A and the reflecting mirror 2204A. Thereby, it is possible to improve the flexibility in the layout design.

Furthermore, it is possible to improve the imaging property on each photosensitive drum by disposing the cylindrical lens 2205a between the reflecting mirror 2204A and the polygon mirror 2104A, and disposing the cylindrical lens 2205b between the beam splitter 2203A and the polygon mirror 2104A.

The aforementioned explanation can be applied also to the pre-deflector optical system B.

Figure 29:
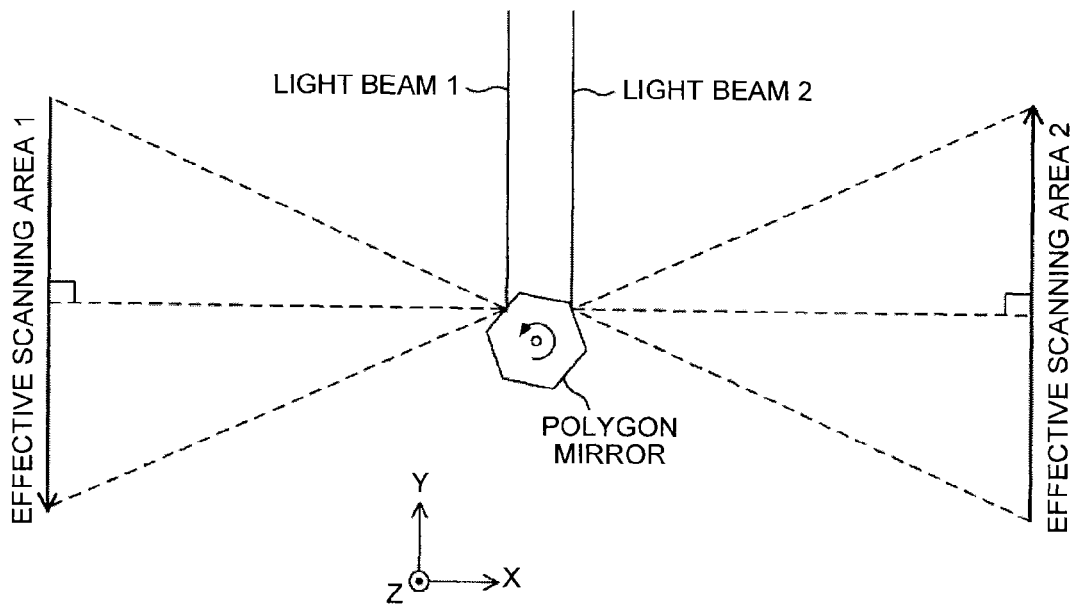
FIG. 29 is a schematic diagram for explaining an optical scanning by a modified example of the optical scanning apparatus.

Next, an explanation will be made on an example of the optical scanning by using a split light. The following explanation is focused on a case that the light beam 1 scans the effective scanning area 1 and the light beam 2 scans the effective scanning area 2, where the effective scanning areas 1 and 2 face each other across the polygon mirror (see FIG. 29).

Figure 30A:
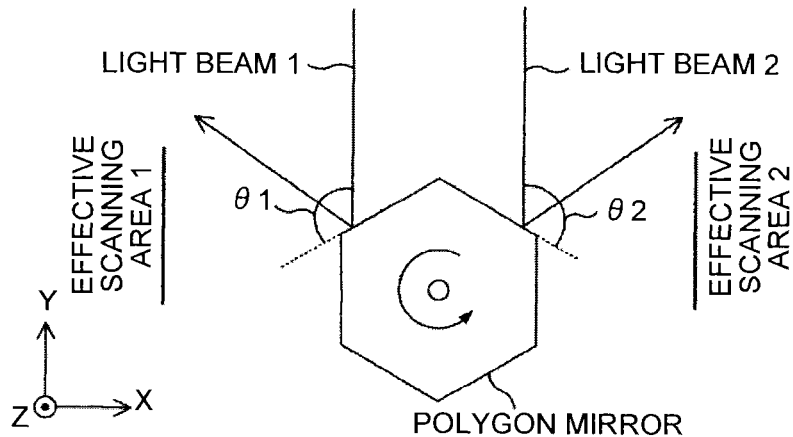
FIG. 30A is another schematic diagram for explaining an optical scanning by the modified example of the optical scanning apparatus.
Figure 30B:
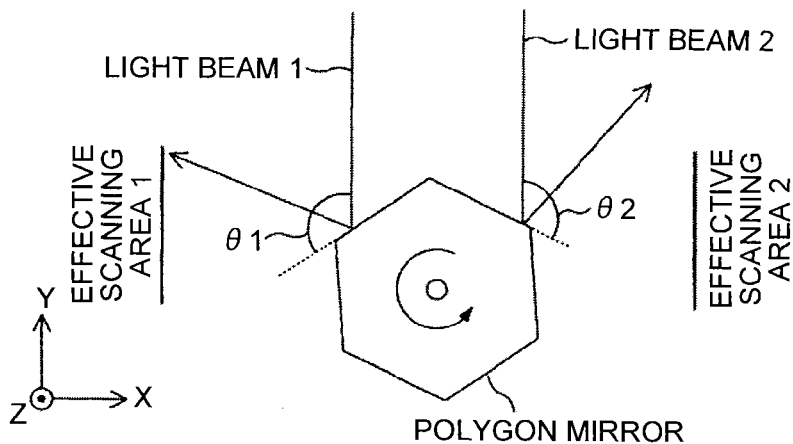
FIG. 30B is another schematic diagram for explaining an optical scanning by the modified example of the optical scanning apparatus.

FIG. 30A shows a state where neither the effective scanning area 1 nor the effective scanning area 2 is scanned. If the polygon mirror rotates in an anti-clockwise direction from the state of FIG. 30A, the light beam 1, more specifically the reflected light of the light beam 1, begins to scan the effective scanning area 1. At this time, the reflected light of the light beam 2 directs toward a position apart from the effective scanning area 2.

Figure 30C:
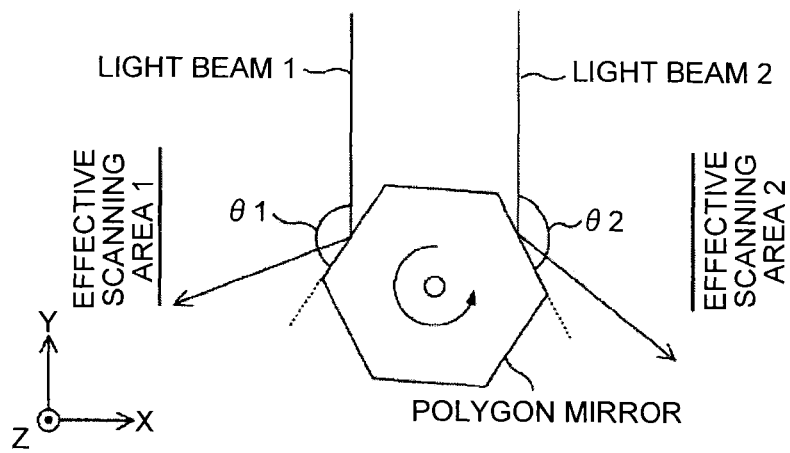
FIG. 30C is another schematic diagram for explaining an optical scanning by the modified example of the optical scanning apparatus.

If the polygon mirror further rotates, the reflected light of the light beam 1 terminates the scanning of the effective scanning area 1 as illustrated in FIG. 30C. While the reflected light of the light beam 1 scans the effective scanning area 1 toward the "−Y" direction, the light beam 2 enters the next deflecting reflection surface. Then, the reflected light of the light beam 2 moves to the "−Y" side of the effective scanning area 2 and approaches the effective scanning area 2.

Figure 31A:
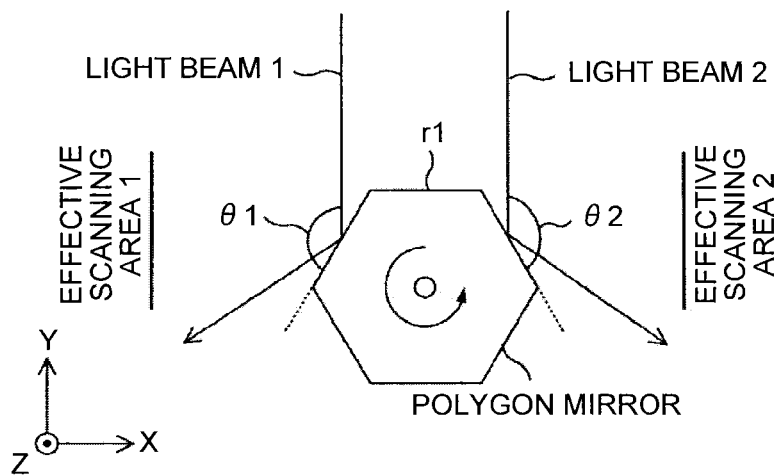
FIG. 31A is still another schematic diagram for explaining optical scanning by the modified example of the optical scanning apparatus.

FIG. 31A shows a state where the polygon mirror further rotated in an anti-clockwise direction by 30 degrees from the state of FIG. 30A. At this time, each incident point of the light beam LB1 and the light beam LB2 to the polygon mirror is arranged or set so that an angle θ1 which is formed between the light beam 1 toward the deflecting reflection surface and the deflecting reflection surface and which includes the reflected light of the light beam LB1 is obtuse, and so that an angle θ2 which is formed between the light beam 2 toward the deflecting reflection surface and the deflecting reflection surface and which includes the reflected light of the light beam LB2 is obtuse. In other words, the light beams 1 and 2 are arranged so as not to enter the deflecting reflection surface r1 under this condition.

Figure 31B:
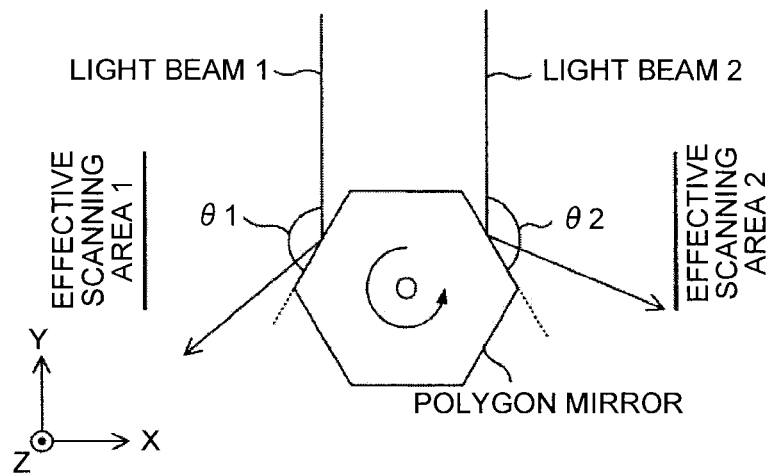
FIG. 31B is still another schematic diagram for explaining optical scanning by the modified example of the optical scanning apparatus.

If the polygon mirror further rotates, the reflected light of the light beam 2 begins to scan the effective scanning area 2, and the reflected light of the light beam 1 directs toward a position apart from the effective scanning area 1, as illustrated in FIG. 31B.

Figure 31C:
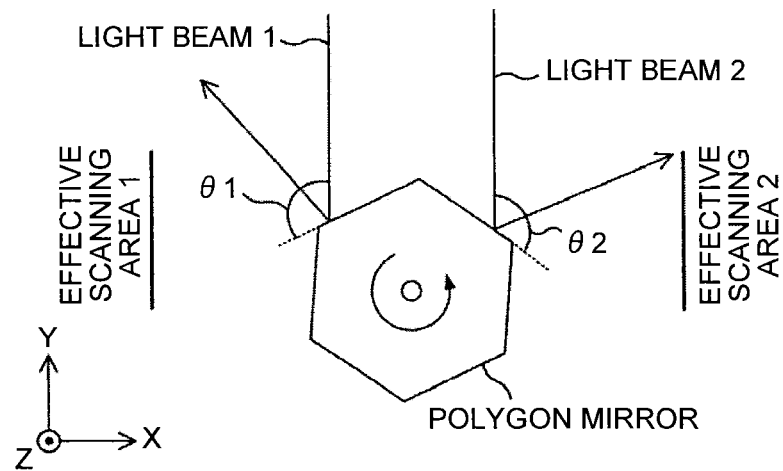
FIG. 31C is still another schematic diagram for explaining optical scanning by the modified example of the optical scanning apparatus.

If the polygon mirror further rotates, the reflected light of the light beam 2 terminates the scanning of the effective scanning area 2, as illustrated in FIG. 31C. While the reflected light of the light beam 2 scans the effective scanning area 2 toward the "+Y" direction, the light beam enters the next deflecting reflection surface. Then, the reflected light of the light beam 1 moves to the "+Y" side of the effective scanning area 1 and approaches the effective scanning area 1.

If the polygon mirror further rotates, it returns to the state of FIG. 30A.

The scanning control unit drives and modulates the light source (performs so-called "hencho-kudo"), on the basis of the corresponding component color image information (e.g. cyan color image information), while the reflected light of the light beam 1 performs the scanning within the effective scanning area 1. The scanning control unit drives and modulates the light source (performs so-called "hencho-kudo"), on the basis of the corresponding component color image information (e.g. black color image information), while the reflected light of the light beam 2 performs the scanning within the effective scanning area 2. Thereby, it is possible to write two kinds of the component color image information onto the different scanning target surfaces respectively by one common light source (see FIG. 32). Incidentally, FIG. 32 omits the illustration of APC and synchronous detection.

Figure 33A:
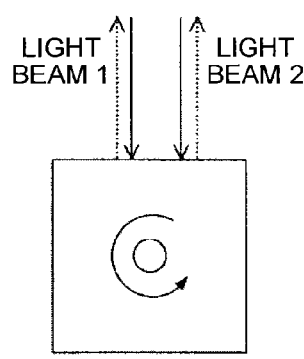
FIG. 33A is a schematic diagram for explaining a relationship between two light beams and a rotating polygon mirror.
Figure 33B:
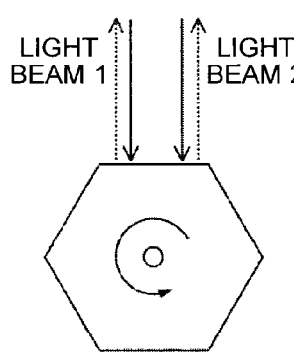
FIG. 33B is another schematic diagram for explaining a relationship between two light beams and a rotating polygon mirror.
Figure 33C:
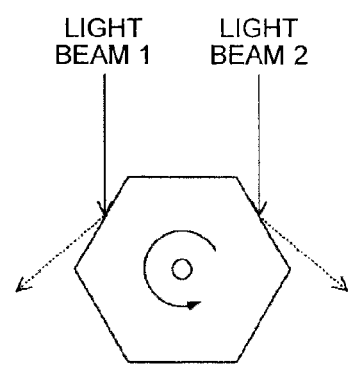
FIG. 33C is still another schematic diagram for explaining a relationship between two light beams and a rotating polygon mirror.

By the way, in a case where the polygon mirror is comprised of a four-faceted rotating mirror, the return light inevitably is caused, if two light beams (light beam 1 and light beam 2) which are split by the beam splitter continuously irradiate the deflecting reflection surface (see FIG. 33A). In a case where the polygon mirror is comprised of a six-faceted rotating mirror and where a length of the deflecting reflection surface in the X axis direction is longer than a spatial gap between two light beams, the return light is caused as illustrate in FIG. 33B. As illustrated in FIG. 33C, however, the spatial gap between two light beams is wider or longer than the length of the deflecting reflection surface in the X axis direction, the deflecting reflection surface is prevented from being vertical with respect to the incident light.

In this case, the angle which is formed between the light beam 1 toward the deflecting reflection surface and the deflecting reflection surface and which includes the reflected light of the light beam 1 is obtuse. Similarly, the angle which is formed between the light beam 2 toward the deflecting reflection surface and the deflecting reflection surface and which includes the reflected light of the light beam 2 is obtuse. This configuration makes it possible to eliminate the return light to the light source, to reduce the optical elements or components disposed between the light source and the polygon mirror, to reduce the cost, and to improve the flexibility in the layout design. Furthermore, since there is no return light, the accurate light amount control can be facilitated.

If there is any variation among the plurality of deflecting reflection surfaces, the position of the light spot on the photosensitive drum surface may deviate to the sub scanning direction. In order to correct such a deviation (so-called "men-daore hosei" or "optical face tangle error correction"), the cylindrical lens is arranged so that its focal line is positioned in the vicinity of the deflecting reflection surface of the polygon mirror.

Figure 34:
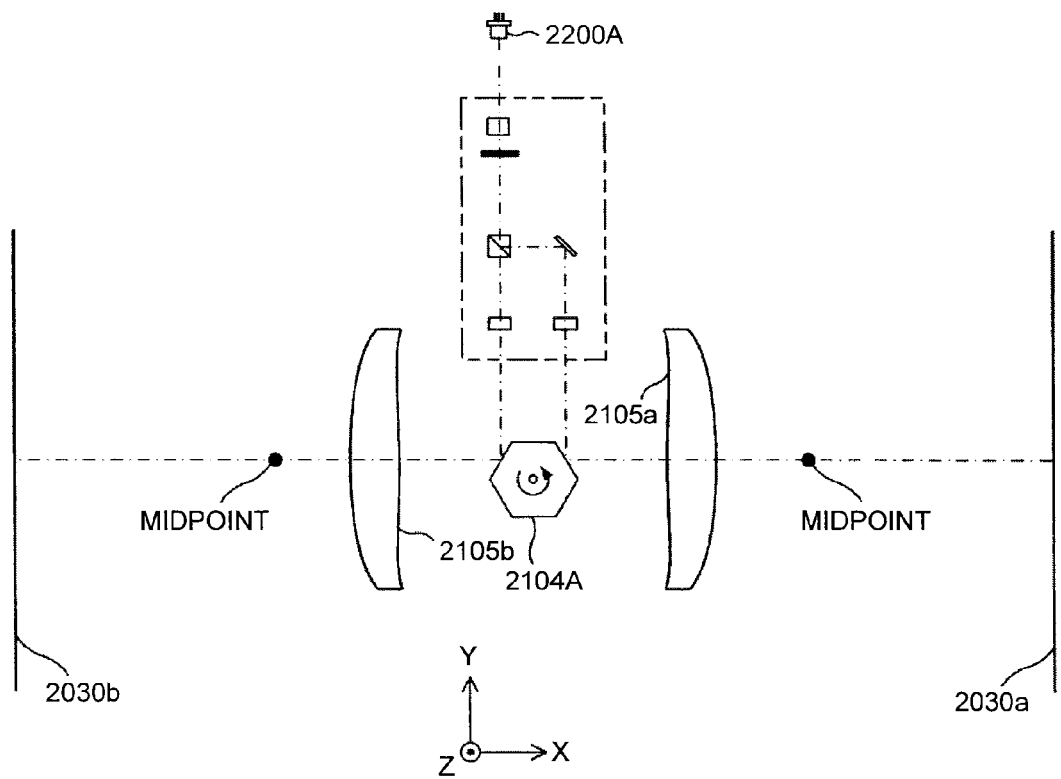
FIG. 34 is a schematic diagram for explaining a midpoint on a light path of a light beam from the polygon mirror to a target surface.
Figure 35A:
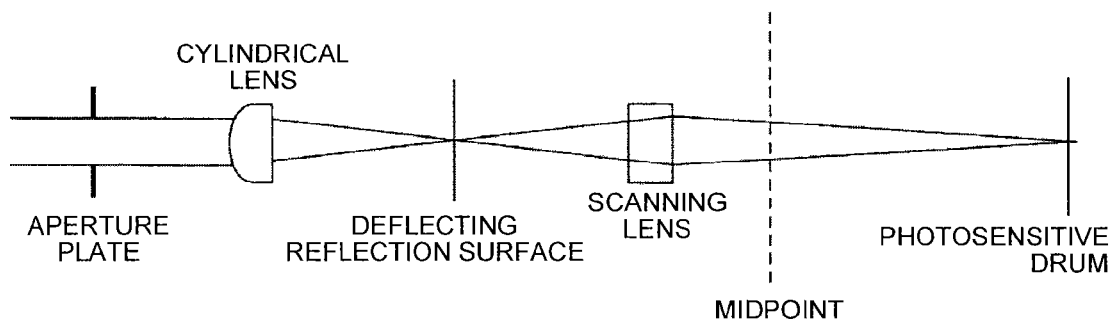
FIG. 35A is a schematic diagram for explaining a light path in a case where a scanning lens is disposed between the polygon mirror and the midpoint.
Figure 35B:
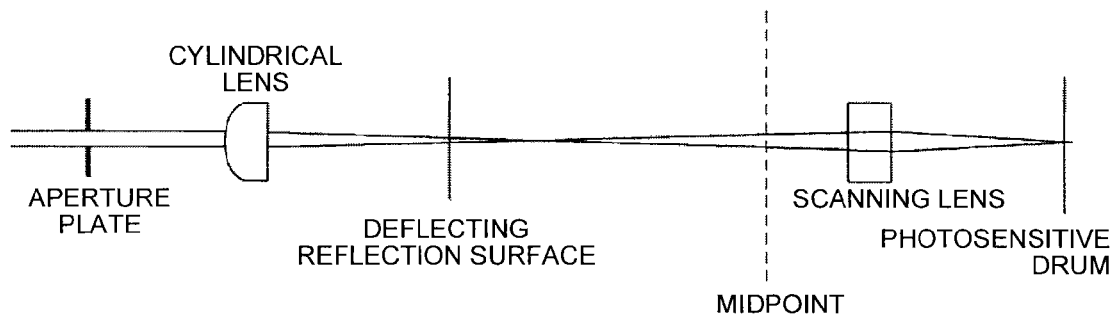
FIG. 35B is a schematic diagram for explaining a light path in a case where a scanning lens is disposed between the midpoint and the target surface.

In order to make uniform the beam spot diameter on the photosensitive drum surface with respect to the sub scanning direction, two cases are compared and studied without changing the convergence angle. One is a case where the scanning lens is disposed between the polygon mirror and the midpoint (see FIG. 35A). The midpoint is a middle point between the polygon mirror and the photosensitive drum surface (see FIG. 34). The other is a case where the scanning lens is disposed between the midpoint and the photosensitive drum surface (see FIG. 35B). It is apparent from the comparison between FIG. 35A and FIG. 35B that the aperture size of the aperture plate can be made larger in a case illustrated in FIG. 35A than a case illustrated in FIG. 35B.

In the optical scanning apparatus 2010A, the light beam emitted from the light source is split into two light beams. Thereby, it is preferable to increase the aperture size of the aperture plate and thereby increase the light amount of the light beam toward the photosensitive drum. Therefore, the scanning lens is disposed between the polygon mirror and the midpoint.

Figure 36A:
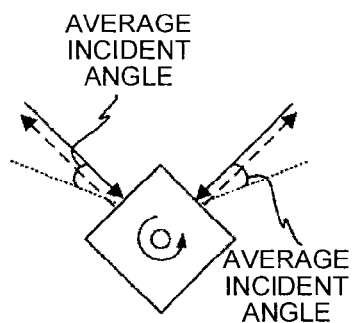
FIG. 36A is a schematic diagram for explaining a relationship between an average incident angle of two light beams and a rotating polygon mirror.

With regard to optically scanning two target surfaces which are disposed so as to face each other across the polygon mirror, if the polygon mirror is comprised of a four-faceted rotating mirror and the average incident angle of the light beam which enters the polygon mirror is set as about 22.5 degrees, the return light is caused as illustrated in FIG. 36A.

Figure 36B:
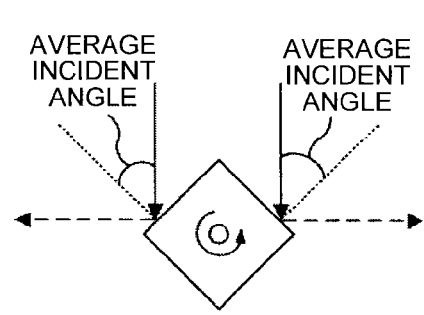
FIG. 36B is a schematic diagram for explaining a relationship between an average incident angle of two light beams and a rotating polygon mirror.

In the embodiment, in order to eliminate the return light to the light source, the angle which is formed between the light beam toward the deflecting reflection surface and the deflecting reflection surface and which includes the reflected light of the light beam is arrange or set to be obtuse. As illustrated in FIG. 36B, it is effective to increase the average incident angle of the light beam with respect to the deflecting reflection surface, such as 45 degrees. As illustrated in FIG. 36B, however, two target surfaces are scanned at the same timing. In this case, it is not possible to scan the different target surfaces independently of each other with the common light source.

Figure 36C:
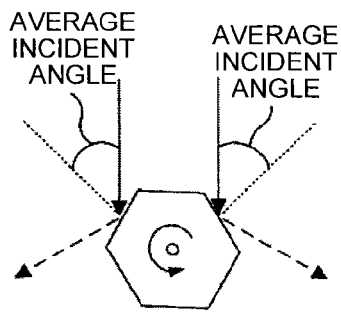
FIG. 36C is a schematic diagram for explaining a relationship between an average incident angle of two light beams and a rotating polygon mirror.

As illustrated in FIG. 36C, if the polygon mirror is comprised of a six-faceted rotating mirror, it is possible to scan two different target surfaces independently of each other with the common light source, while keeping the condition to eliminate the return light.

Relating to this, the deflection angle is 120 degrees for scanning one line on one surface, in order to optically scan the different target surfaces independently of each other with the light beams from the one common light source. Thereby, the field angle needs to be smaller than 60 degrees, in order to draw two scanning lines (two colors) during the range.

In a case where the polygon mirror is not comprised of the six-faceted rotating mirror, the return light to the light source may be caused. Otherwise, the enough view angle may not be maintained. Thereby, the longer the light path may be required between the deflecting reflection surface and the photosensitive drum surface in order to maintain the scanning width same as in the six-faceted polygon mirror. This may increase the size of the whole apparatus.

Next, examples will be given for numerical values relating to the optical scanning apparatus 2010A.

A wavelength of the light beam emitted from each light source is 655 nm. A focal length of each coupling lens is 27 mm. A radius of the incircle of the six-faceted mirror of each polygon mirror is 13 mm. A longitudinal length of the deflecting reflection surface is 15 mm. A focal length of each cylindrical lens is 47 mm.

Figure 37:
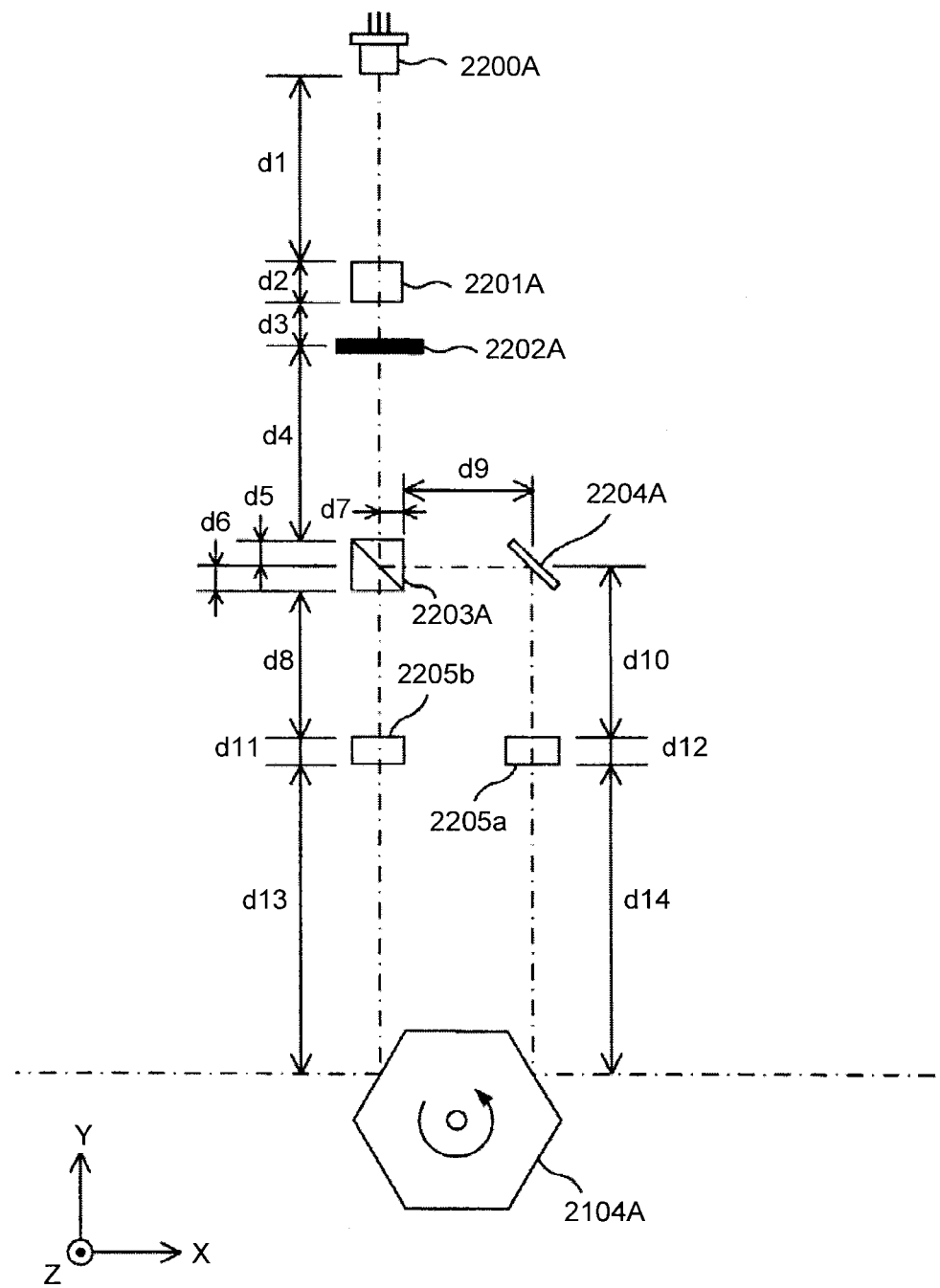
FIG. 37 is a schematic diagram for explaining a specific example of an arrangement of main optical elements in a modified example of the optical scanning apparatus.
Figure 38:
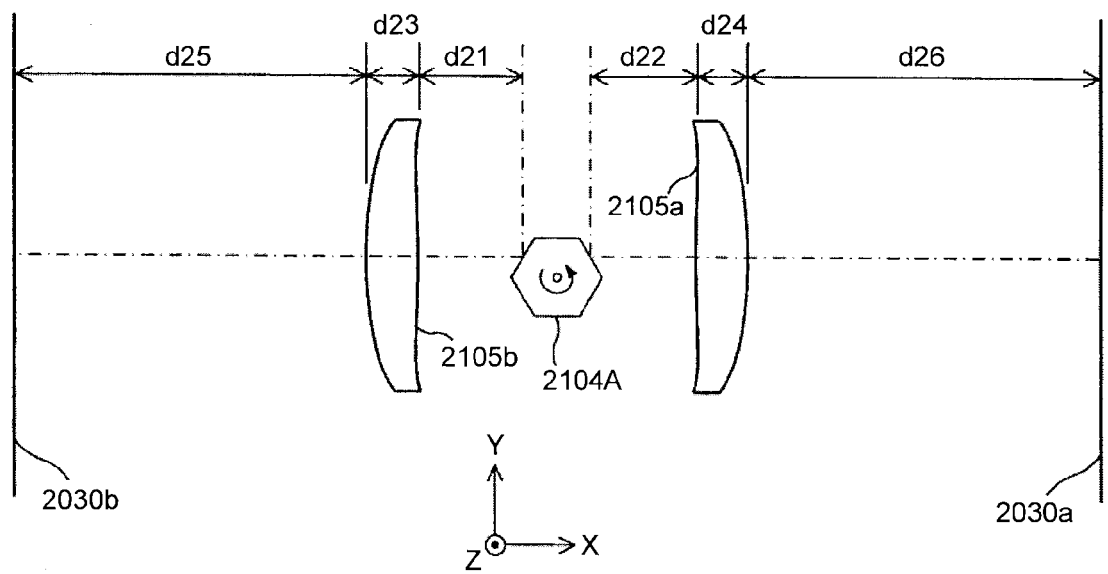
FIG. 38 is another schematic diagram for explaining a specific example of an arrangement of main optical elements in a modified example of the optical scanning apparatus.

FIG. 37 to FIG. 39 show an example of each light path length and each lens central thickness.

Figure 40:
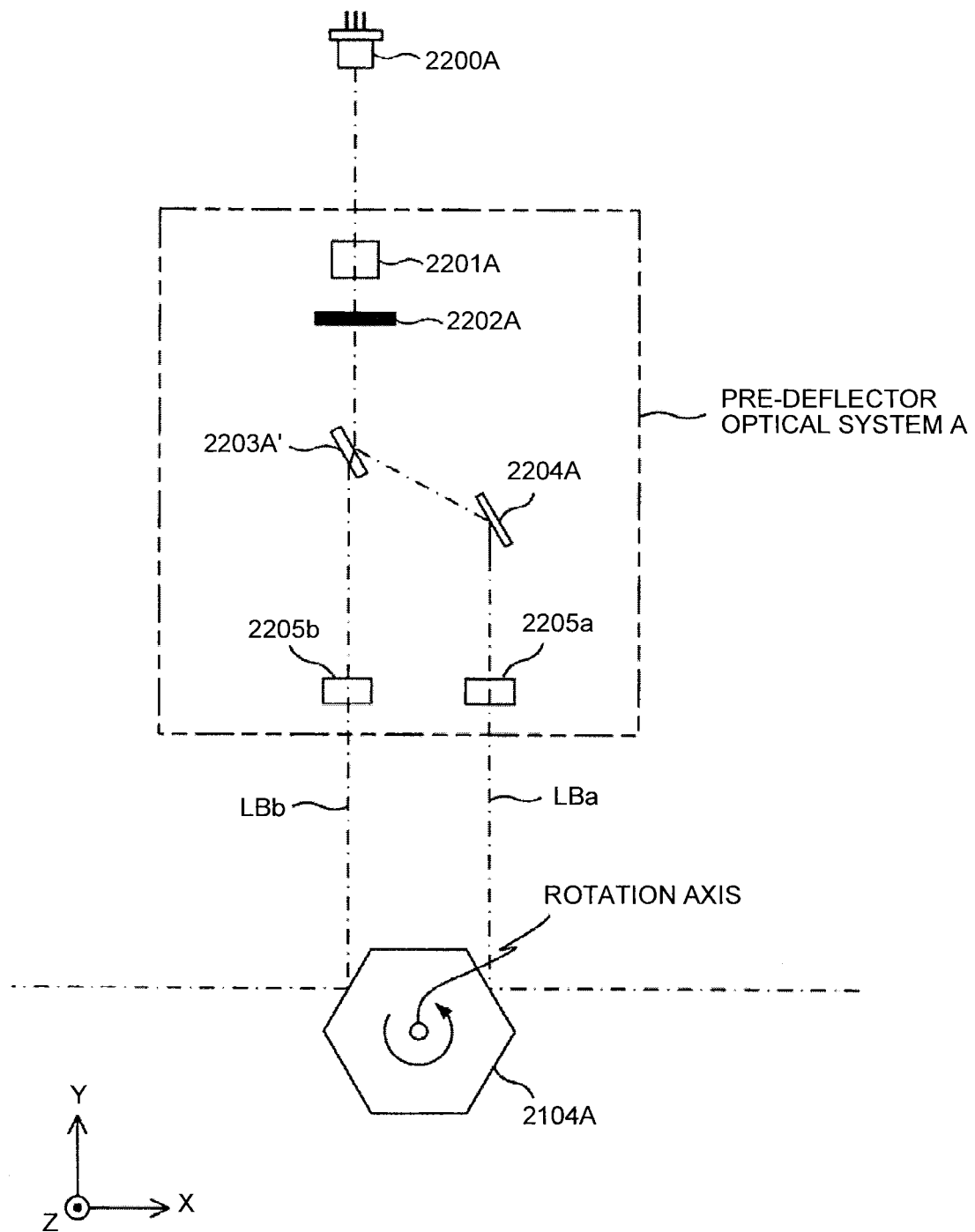
FIG. 40 is a schematic diagram for explaining a case where a plate-like splitting device is used in a modified example of the optical scanning apparatus.

A plate-type splitting device 2203A' may be used instead of the beam splitter 2203A, as one example illustrated in FIG. 40. In this case, the incident angle of the light beam to the plate-type splitting device 2203A' is arranged or set as 50 to 60 degrees. Also, a plate-type splitting device similarly to the plate-type splitting device 2203A' may be used instead of the beam splitter 2203B.

The aforementioned embodiment has been explained focusing on the example where the light beam enters the deflecting reflection surface in a direction parallel to a surface orthogonal to the rotation axis (i.e. horizontal incident). However, the embodiment is not limited to this. The light beam may enter the deflecting reflection surface in a direction oblique to the surface orthogonal to the rotation axis (i.e. oblique incident). In this case, the number of scanning lens can be reduced. Thereby, the downsizing in the apparatus size and the cost can be further promoted.

In the above embodiment, although the image forming apparatus which transfers a toner image from a photosensitive drum to a recording sheet through a transfer belt has been described, this invention is not limited to this and may be applied to an image forming apparatus which transfers a toner image directly to a recording sheet.

This invention may be applied to an image forming apparatus using a silver halide film as an image carrier. In this image forming apparatus, a latent image is formed on the silver halide film by optical scanning, and the latent image can be visualized by a process equivalent to a developing process in a general silver halide photography process. The image can be transferred to a printing paper as an object to be transferred by a process equivalent to a printing process in the general silver halide photography process. Such an image forming apparatus can be embodied as an optical plate-making apparatus and an optical drawing apparatus which draws a CT scan image and the like.

This invention may be applied to an image forming apparatus using, as an image carrier, a coloring medium (positive printing paper) colored by heat energy of a beam spot. In this case, a visible image can be formed directly on an image carrier by optical scanning.

In the above embodiment, although the color printer has been described as the image forming apparatus, this invention may be preferably applied to an image forming apparatus other than a printer, such as a copier, a facsimile, and a complex machine in which these apparatus are integrated.

With the optical scanning apparatus according to the present invention, a return light to a light source can be eliminated without leading to increase in size and cost.

With the image forming apparatus according to the present invention, cost reduction can be realized without lowering image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus for scanning a target surface with a light beam along a main scanning direction, the apparatus comprising:
    a light source;
    an optical deflector which includes a rotating multi-faceted mirror, each surface of the multi-faceted mirror acting as a reflecting surface to deflect the light beam emitted from the light source; and
    a scanning optical system configured to guide the light beam deflected by the optical deflector to the target surface, wherein
    an angle which is formed between the light beam directed toward the optical deflector and a corresponding reflecting surface of the multi-faceted mirror that reflects the light beam directed toward the optical deflector, and which includes a reflected light of the light beam that is reflected from the corresponding reflecting surface, is always obtuse, wherein a light amount of the light beam emitted from the light source is adjusted at a timing when the light beam emitted from the light source enters two reflecting surfaces of the optical deflector, the two reflecting surfaces are adjacent to each other, and one of the two reflecting surfaces is a reflecting surface which finishes scanning the target surface and the other of the two reflecting surfaces is a reflecting surface which starts scanning the target surface, two light beams enter the optical deflector so that the two light beams enter reflecting surfaces of the optical deflector that are different from each other, the two light beams that enter the optical deflector are parallel, a distance between the two light beams is wider than a length of each reflecting surface of the optical deflector, and the two light beams do not enter a reflecting surface that includes an incidence angle of 0° relative to each of the two light beams.

2. The optical scanning apparatus according to claim 1, wherein
the light source emits a plurality of light beams, and
a light amount for every one of the light beams is adjusted every time when the target surface is scanned.

3. The optical scanning apparatus according to claim 1, wherein
a traveling direction of the two light beam which enter the optical deflector is parallel to the main scanning direction, when viewed from a rotation axis of the optical deflector.

4. The optical scanning apparatus according to claim 1, further comprising
a pre-deflector optical system which is deposed between the light source and the optical deflector, and which splits the light beam emitted from the light source into the two light beams and guides each of the two light beams to different reflecting surfaces of the optical deflector, wherein
one of the two light beams from the pre-deflector optical system is deflected toward one side with respect to the optical deflector, and the other of the two light beams from the pre-deflector optical system is deflected toward the other side with respect to the optical deflector.

5. The optical scanning apparatus according to claim 4, wherein
the pre-deflector optical system includes an optical splitting device to split the light beam emitted from the light source into the two light beams,
the two light beams have different light paths from the optical splitting device to the optical deflector, and
one of the different light path includes one or more mirrors disposed therein different in its number from the other of the different light path.

6. The optical scanning apparatus according to claim 4, wherein
the pre-deflector optical system includes an optical splitting device to split the light beam emitted from the light source into the two light beams, and
a light path of one of the two light beams from the optical splitting device to the optical deflector has a length different from a length of a light path of the other of the two light beams from the optical splitting device to the optical deflector.

7. The optical scanning apparatus according to claim 4, wherein
the scanning optical system returns one of the two light beams from the pre-deflector optical system which is deflected toward one side with respect to the optical deflector to the other side with respect to the optical deflector, and guides the returned light beam to the target surface.

8. The optical scanning apparatus according to claim 1, further comprising
circuitry configured to perform an auto power control when the light beam emitted from the light source enters the two reflecting surfaces of the optical deflector, to control an output level of the light source while at least a part of the light beam is monitored by a detector.

9. An image forming apparatus comprising:
a plurality of image carrying bodies; and
an optical scanning apparatus configured to scan a surface of each of the plurality of image carrying bodies as a target surface along a main scanning direction with a light beam modulated on the basis of image information corresponding to each image carrying body, wherein
the optical scanning apparatus includes:
a light source,
an optical deflector which includes a rotating multi-faceted mirror, each surface of the multi-faceted mirror acting as a reflecting surface to deflect the light beam emitted from the light source, and
a scanning optical system configured to guide the light beam deflected by the optical deflector to a target surface, wherein
an angle which is formed between the light beam directed toward the optical deflector and a corresponding reflecting surface of the multi-faceted mirror that reflects the light beam directed toward the optical deflector, and which includes a reflected light of the light beam that is reflected from the corresponding reflecting surface, is always obtuse, wherein
a light amount of the light beam emitted from the light source is adjusted at a timing when the light beam emitted from the light source enters two reflecting surfaces of the optical deflector,
the two reflecting surfaces are adjacent to each other, and one of the two reflecting surfaces is a reflecting surface which finishes scanning the target surface and the other of the two reflecting surfaces is a reflecting surface which starts scanning the target surface,
two light beams enter the optical deflector so that the two light beams enter reflecting surfaces of the optical deflector that are different from each other,
the two light beams that enter the optical deflector are parallel,
a distance between the two light beams is wider than a length of each reflecting surface of the optical deflector, and
the two light beams do not enter a reflecting surface that includes an incidence angle of 0° relative to each of the two light beams.

10. The image forming apparatus according to claim 9, wherein the optical scanning apparatus further includes
circuitry configured to perform an auto power control when the light beam emitted from the light source enters the two reflecting surfaces of the optical deflector, to control an output level of the light source while at least a part of the light beam is monitored by a detector.

11. An optical scanning apparatus for scanning a target surface with a light beam along a main scanning direction, the apparatus comprising:

a light source;

an optical deflector which includes a rotating multi-faceted mirror, each surface of the multi-faceted mirror acting as a reflecting surface to deflect the light beam emitted from the light source; and a scanning optical system configured to guide the light beam deflected by the optical deflector to the target surface, wherein an angle which is formed between the light beam directed toward the optical deflector and a corresponding reflecting surface of the multi-faceted mirror that reflects the light beam directed toward the optical deflector, and which includes a reflected light of the light beam that is reflected from the corresponding reflecting surface, is always obtuse, wherein a light amount of the light beam emitted from the light source is adjusted at a timing when the light beam emitted from the light source enters two reflecting surfaces of the optical deflector, the two reflecting surfaces are adjacent to each other, and one of the two reflecting surfaces is a reflecting surface which finishes scanning the target surface and the other of the two reflecting surfaces is a reflecting surface which starts scanning the target surface, and the light source is positioned so that an optical axis of the light source, along which the light beam emitted from the light source is directed, is never perpendicular to any reflecting surface of the optical deflector.

* * * * *